US011909017B2

(12) United States Patent
Kotake et al.

(10) Patent No.: US 11,909,017 B2
(45) Date of Patent: Feb. 20, 2024

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Hirokazu Kotake, Kariya (JP); Takafumi Yamasaki, Kariya (JP); Tsuyoshi Mariya, Kariya (JP); Daiki Terashima, Okazaki (JP); Satoshi Morioka, Okazaki (JP); Yusuke Hase, Seto (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 444 days.

(21) Appl. No.: 17/311,093

(22) PCT Filed: Nov. 21, 2019

(86) PCT No.: PCT/JP2019/045695
§ 371 (c)(1),
(2) Date: Jun. 4, 2021

(87) PCT Pub. No.: WO2020/129535
PCT Pub. Date: Jun. 25, 2020

(65) Prior Publication Data
US 2022/0045377 A1 Feb. 10, 2022

(30) Foreign Application Priority Data
Dec. 20, 2018 (JP) .................................. 2018-238041

(51) Int. Cl.
*H01M 10/613* (2014.01)
*H01M 10/625* (2014.01)
(Continued)

(52) U.S. Cl.
CPC ............ *H01M 10/613* (2015.04); *H01G 2/08* (2013.01); *H01G 11/10* (2013.01);
(Continued)

(58) Field of Classification Search
CPC ............ H01M 10/613; H01M 10/625; H01M 10/647; H01M 10/653; H01M 10/6557;
(Continued)

(56) References Cited

U.S. PATENT DOCUMENTS

2009/0325055 A1\* 12/2009 Koetting ............. H01M 10/613
429/120
2010/0055547 A1 3/2010 Nakamura
(Continued)

FOREIGN PATENT DOCUMENTS

| JP | 2007-165200 A | 6/2007 |
| JP | 2008-204763 A | 9/2008 |
| JP | 2011-204386 A | 10/2011 |

OTHER PUBLICATIONS

International Preliminary Report on Patentability dated Jun. 16, 2021 in International Application No. PCT/JP2019/045695.

*Primary Examiner* — James M Erwin
(74) *Attorney, Agent, or Firm* — Sughrue Mion, PLLC

(57) ABSTRACT

A power storage device includes a plurality of laminated power storage modules, a flow path member disposed in contact with the power storage modules and having flow paths for allowing a cooling medium to flow along a first direction intersecting a laminating direction of the power storage modules, a pair of restraining plates disposed to sandwich the power storage modules and the flow path
(Continued)

member in the laminating direction, fastening members applying a restraining load to the power storage modules and the flow path member via the pair of restraining plates by fastening the restraining plates to each other, and a lead-in duct disposed at one end portion of the flow path member in the first direction and leading the cooling medium into each of the flow paths.

8 Claims, 12 Drawing Sheets

(51) Int. Cl.
| | |
|---|---|
| *H01M 10/647* | (2014.01) |
| *H01M 10/653* | (2014.01) |
| *H01M 10/6557* | (2014.01) |
| *H01M 10/6563* | (2014.01) |
| *H01M 10/6566* | (2014.01) |
| *H01M 10/6568* | (2014.01) |
| *H01M 50/249* | (2021.01) |
| *H01M 50/209* | (2021.01) |
| *H01G 2/08* | (2006.01) |
| *H01G 11/10* | (2013.01) |
| *H01M 10/04* | (2006.01) |
| *H01M 50/289* | (2021.01) |
| *H01M 50/264* | (2021.01) |
| *H01M 50/204* | (2021.01) |

(52) U.S. Cl.
CPC ..... *H01M 10/0481* (2013.01); *H01M 10/625* (2015.04); *H01M 10/647* (2015.04); *H01M 10/653* (2015.04); *H01M 10/6557* (2015.04); *H01M 10/6563* (2015.04); *H01M 10/6566* (2015.04); *H01M 10/6568* (2015.04); *H01M 50/204* (2021.01); *H01M 50/209* (2021.01); *H01M 50/249* (2021.01); *H01M 50/264* (2021.01); *H01M 50/289* (2021.01); *H01M 2220/20* (2013.01)

(58) Field of Classification Search
CPC ......... H01M 10/6563; H01M 10/6566; H01M 10/6568; H01M 50/249; H01M 50/209
USPC ........................................................ 429/120
See application file for complete search history.

(56) References Cited

U.S. PATENT DOCUMENTS

| | | | |
|---|---|---|---|
| 2014/0186675 A1* | 7/2014 | Boettcher | H01M 50/213 |
| | | | 429/99 |
| 2018/0069222 A1* | 3/2018 | Shaffer, II | H01M 10/044 |
| 2018/0269544 A1* | 9/2018 | Choi | H01M 50/211 |

* cited by examiner

POWER STORAGE DEVICE

CROSS REFERENCE TO RELATED APPLICATIONS

This application is a National Stage of International Application No. PCT/JP2019/045695 filed Nov. 21, 2019, claiming priority based on Japanese Patent Application No. 2018-238041 filed Dec. 20, 2018.

TECHNICAL FIELD

The present disclosure relates to a power storage device.

BACKGROUND ART

Patent Literature 1 discloses a so-called bipolar power storage module provided with a bipolar electrode having a positive electrode provided on one surface of an electrode plate and a negative electrode provided on the other surface.

CITATION LIST

Patent Literature

[Patent Literature 1] Japanese Unexamined Patent Publication No. 2011-204386

SUMMARY OF INVENTION

Technical Problem

It is conceivable to configure a power storage device by laminating a plurality of the above-described power storage modules. In such a power storage device, for example, the plurality of power storage modules are cooled by interposing a flow path member provided with a plurality of flow paths between adjacent power storage modules and by allowing a cooling medium such as air to flow in each flow path of the flow path member. However, when the flow of the cooling medium is unbalanced between the plurality of flow paths provided in the flow path member, there is a problem that cooling performance of the flow path member with respect to the power storage module varies greatly for each position.

An object of the present disclosure is to provide a power storage device capable of suppressing variations in cooling performance for each position.

Solution to Problem

A power storage device according to the present disclosure includes a plurality of laminated power storage modules, a flow path member disposed in contact with the power storage modules and having a plurality of flow paths configured to allow a cooling medium to flow along a first direction intersecting a laminating direction of the power storage modules, a pair of restraining plates disposed to sandwich the plurality of power storage modules and the flow path member in the laminating direction, a plurality of fastening members configured to apply a restraining load to the plurality of power storage modules and the flow path member via the pair of restraining plates by fastening the pair of restraining plates to each other, and a lead-in duct disposed at one end portion of the flow path member in the first direction and configured to lead the cooling medium into each of the plurality of flow paths, in which the plurality of fastening members include a plurality of first fastening members arranged along an extending direction of the lead-in duct at one end portion of the restraining plate in the first direction, and each of the plurality of first fastening members extends along the laminating direction to pass through the inside of the lead-in duct.

In the power storage device according to the present disclosure, a lead-in duct for leading a cooling medium into each of the plurality of flow paths is disposed at one end portion of the flow path member in the first direction. In such a configuration, the flow of the cooling medium inside the lead-in duct may be biased in one direction (an extending direction of the lead-in duct). In this case, the ease of inflow of the cooling medium varies depending on a position of the flow path. Here, in the power storage device according to the present disclosure, each of the plurality of first fastening members disposed along the extending direction of the lead-in duct at one end portion of a restraining plate in the first direction is extended along the laminating direction to pass through the inside of the lead-in duct. Therefore, the flow of the cooling medium flowing through the inside of the lead-in duct is blocked (disturbed) by each first fastening member, and is made uniform in the lead-in duct. As a result, the cooling medium easily flows into each flow path regardless of the position. Accordingly as compared with a configuration in which the flow of the cooling medium is not blocked over the entire length of the lead-in duct in the extending direction, the bias in the flow of the cooling medium between the plurality of flow paths in the flow path member is suppressed, and the variation of the cooling performance for each position can be suppressed.

However, in the power storage module, the restraining load is applied by the fastening member via a pair of restraining plates sandwiching the power storage module. At this time, in order to avoid interference between the lead-in duct and the fastening member, for example, when the fastening member is disposed outside the lead-in duct, a restraining plate having a size corresponding to a position of the fastening member is required, which may cause an increase in the size of the restraining plate.

On the other hand, according to the power storage device according to the present disclosure, the size of the restraining plate can be reduced as compared with when each fastening member is disposed outside the lead-in duct, and the fastening member can also be utilized as a member for reducing the unbalance of the flow with respect to the distance from the lead-in port of the cooling medium flowing each flow path by appropriately disturbing the flow of the cooling medium flowing through the inside of the lead-in duct.

In addition, the power storage device according to the present disclosure may include a lead-out duct disposed at the other end portion of the flow path member in the first direction and configured to allow the cooling medium led out of each of the plurality of flow paths to flow, in which the plurality of fastening members may include a plurality of second fastening members arranged along an extending direction of the lead-out duct at the other end portion of the restraining plate in the first direction, and each of the plurality of second fastening members may extend along the laminating direction to pass through the inside of the lead-out duct. In this case, since the bias of the flow of the cooling medium is suppressed inside the lead-out duct, the bias of the cooling medium from each flow path led to the lead-out duct is easily suppressed, and the variation of the cooling performance for each position can be further suppressed.

In the power storage device according to the present disclosure, the lead-in duct may be provided with a lead-in port configured to lead the cooling medium into the lead-in duct, the lead-out duct may be provided with a lead-out port configured to lead the cooling medium out of the lead-out duct, the lead-in port and the lead-out port may be located on one end portion side in an arrangement direction of the plurality of flow paths, and the plurality of first fastening members may be disposed such that a space between the first fastening members adjacent to each other increases as a distance from the lead-in port increases. In this case, in a configuration in which the lead-in port and the lead-out port are located on the same end portion side in the arrangement direction of the plurality of flow paths, the bias in the flow of the cooling medium between the plurality of flow paths in the flow path member is further suppressed.

In addition, in the power storage device according to the present disclosure, the lead-in duct may be provided with a lead-in port configured to lead the cooling medium into the lead-in duct, the lead-out duct may be provided with a lead-out port configured to lead the cooling medium out of the lead-out duct, the lead-in port may be located on one end portion side in an arrangement direction of the plurality of flow paths, the lead-out port may be located on the other end portion side in an arrangement direction of the plurality of flow paths, and the plurality of first fastening members may be disposed such that a space between the first connections adjacent to each other decreases as a distance from the lead-in port increases. In this case, in a configuration in which the lead-in port and the lead-out port are located at end portion sides different from each other in the arrangement direction of the plurality of flow paths, the bias in the flow of the cooling medium between the plurality of flow paths in the flow path member is further suppressed.

In addition, the power storage device according to the present disclosure may include a plurality of space holding members configured to hold a space between the pair of restraining plates, in which each of the plurality of space holding members may have an insertion hole disposed inside the lead-in duct and through which the first fastening member is inserted. In this case, the space between the pair of restraining plates is held by the space holding member, and a flow aspect of the cooling medium can be controlled by adjusting the shape and size of the space holding member.

Advantageous Effects of Invention

According to the present disclosure, it is possible to provide a power storage device capable of suppressing variations in cooling performance for each position.

DESCRIPTION OF EMBODIMENTS

Figure 1:
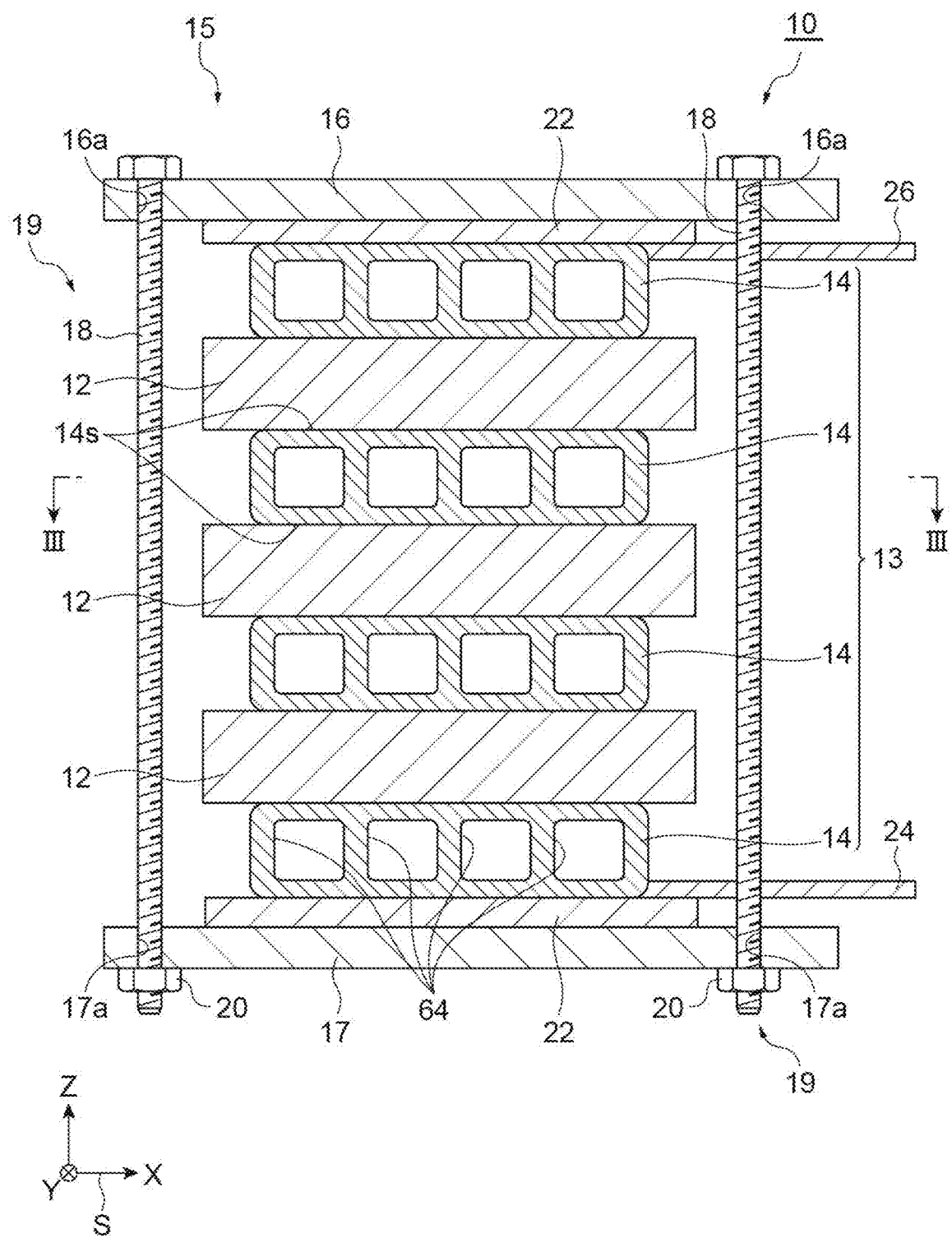
FIG. 1 is a schematic cross-sectional view showing an embodiment of a power storage device.

Hereinafter, one embodiment will be described with reference to the drawings. In the description of the drawings, the same elements or the corresponding elements may be designated by the same reference numerals, and duplicate description may be omitted. Further, the following drawings show a rectangular coordinate system S defined by an X-axis, a Y-axis, and a Z-axis.

First, the configuration of a power storage device according to the embodiment will be described. FIG. 1 is a schematic cross-sectional view showing an embodiment of the power storage device. A power storage device 10 shown in FIG. 1 is used as a battery for various vehicles such as forklifts, hybrid vehicles, and electric vehicles. The power storage device 10 includes a plurality (three in the present embodiment) of power storage modules 12 laminated on each other, a cooling mechanism 13 including a plurality (four in the present embodiment) of cooling members 14 (flow path member), and a restraining member 15. The power storage device 10 may include at least two power storage modules 12 and the cooling mechanism 13 including at least one cooling member 14 disposed between the two power storage modules 12.

The plurality of power storage modules 12 are laminated in one direction. The power storage module 12 is, for example, a bipolar battery including a rectangular plate shape and including a plurality of bipolar electrodes (bipolar electrodes 32 described later). The power storage module 12 is a secondary battery such as a nickel hydrogen secondary battery or a lithium ion secondary battery, but may be an electric double layer capacitor. In the following explanation, a nickel hydrogen secondary battery will be exemplified.

The cooling member 14 is disposed in contact with the power storage module 12. The cooling member 14 cools the power storage module 12 by the flow of the cooling medium. Each cooling member 14 is provided with a plurality of flow paths 64 for allowing the cooling medium to flow. Each of the plurality of flow paths 64 extends along a first direction (here, the Y direction) intersecting (orthogonal to) the laminating direction (for example, the direction Z is hereinafter simply referred to as "laminating direction") of the power storage module 12, and is disposed along a second direction (here, the X direction) intersecting (orthogonal to) the laminating direction and the first direction. The detailed configuration of these will be described later.

The cooling member 14 is formed of a conductive material such as metal and has conductivity. The cooling member 14 is laminated together with the power storage module 12 along the laminating direction, and is electrically connected to the power storage modules 12 adjacent to each other along the laminating direction. As a result, a plurality of power storage modules 12 are connected in series in the laminating direction. Each of the cooling members 14 is disposed between the power storage modules 12 adjacent to each other in the laminating direction and outside the power storage modules 12 located at a laminated end.

A positive electrode terminal 24 is connected to one cooling members 14 disposed outside the power storage module 12 located at the laminated end. A negative electrode terminal 26 is connected to the other cooling members 14 disposed outside the power storage module 12 located at the laminated end. The positive electrode terminal 24 and the negative electrode terminal 26 are drawn out from, for example, the edge portion of the cooling member 14 in a direction intersecting the laminating direction (here, the X direction). The positive electrode terminal 24 and the negative electrode terminal 26 charge and discharge the power storage device 10. Instead of disposing the cooling member 14 outside the power storage module located at the laminated end, a current collecting member having no flow path 64 may be disposed, and the positive electrode terminal 24 and the negative electrode terminal 26 may be connected to the current collecting member.

In the example of FIG. 1, an area of the cooling member 14 viewed from the laminating direction is smaller than an area of the power storage module 12, but from the viewpoint of improving heat radiation, the area of the cooling member 14 may be the same as the area of the power storage module 12 or larger than the area of the power storage module 12.

The restraining member 15 applies a restraining load to the plurality of power storage modules 12. The restraining member 15 has a pair of end plates 16 and 17 (restraining plates) and a plurality of fastening members 19. The pair of end plates 16 and 17 are disposed to sandwich the plurality of power storage modules 12 and the plurality of cooling members 14 along the laminating direction. That is, the cooling member 14 is sandwiched between the pair of end plates 16 and 17 together with the power storage module 12 in a state where the cooling member 14 is laminated along the laminating direction with respect to the power storage module 12.

The end plates 16 and 17 are rectangular metal plates having an area one size larger than the area of the power storage module 12 and the cooling member 14 when viewed from the laminating direction. Insertion holes 16a and 17a are provided at edge portions of the end plates 16 and 17 at positions outside the power storage module 12. An insulating member 22 having electrically insulating property is provided on an inner side surface (a surface on the cooling member 14 side) of the end plates 16 and 17. The insulating member 22 insulates between the end plates 16 and 17 and the cooling member 14. The insulating member 22 is formed, for example, in the form of a film or a thin plate.

The fastening member 19 includes a restraining bolt 18 and a nut 20. Each of the plurality of restraining bolts 18 extends along the laminating direction. Each of the restraining bolts 18 is passed from the insertion hole 16a of one end plate 16 toward the insertion hole 17a of the other end plate 17, and the nut 20 is screwed to a distal end portion of each restraining bolt 18 protruding from the insertion hole 17a of the other end plate 17. As a result, the end plates 16 and 17 are fastened, and the plurality of power storage modules 12 and the plurality of cooling members 14 are pinched by the end plates 16 and 17 to be unitized. The plurality of restraining bolts 18 and the plurality of nuts 20 apply the restraining load to the plurality of power storage modules 12 and the plurality of cooling members 14 by fastening the end plates 16 and 17.

Figure 2:
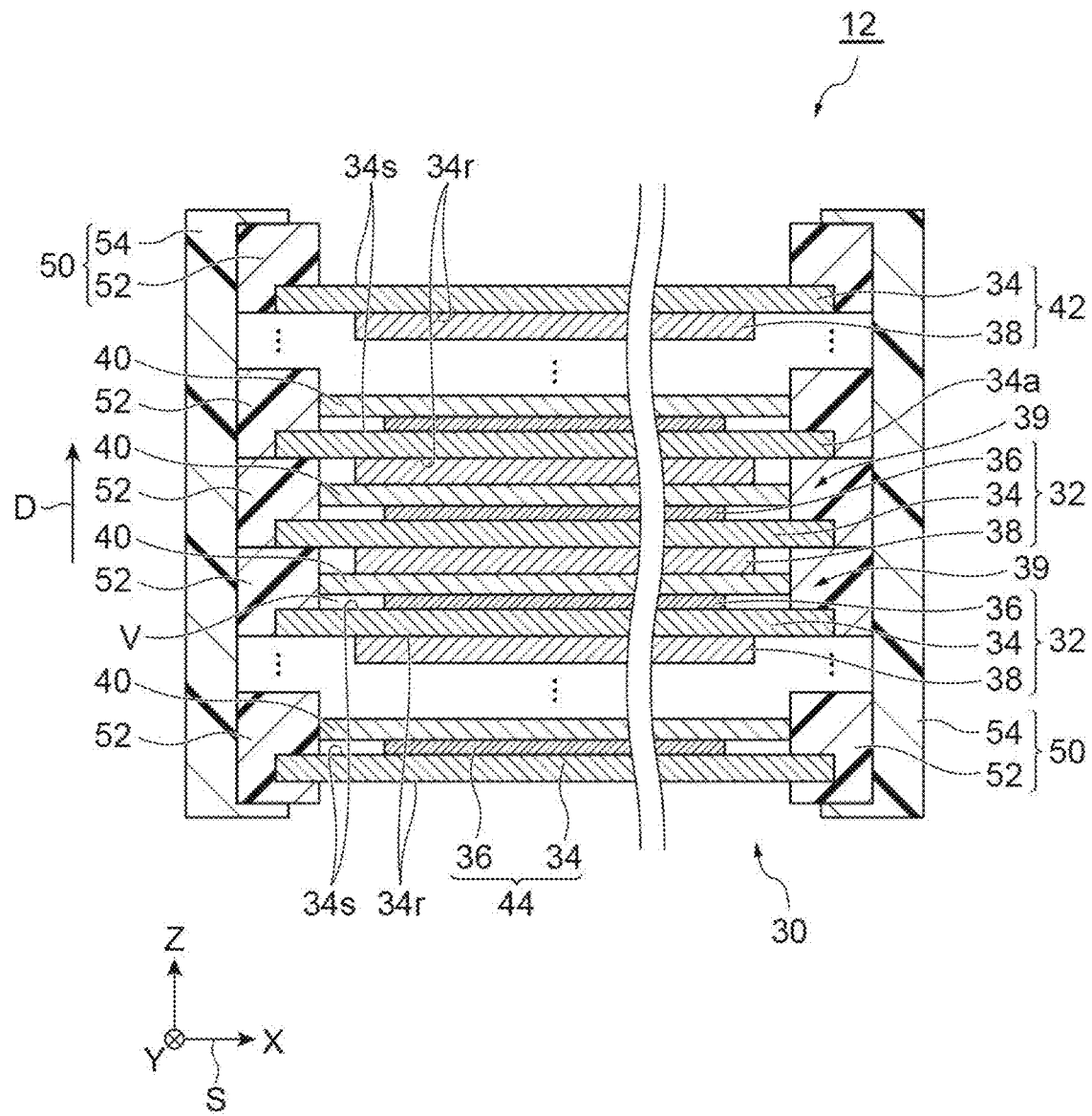
FIG. 2 is a schematic cross-sectional view showing an internal configuration of the power storage module shown in FIG. 1.

Next, the configuration of the power storage module 12 will be described in more detail. FIG. 2 is a schematic cross-sectional view showing an internal configuration of the power storage module shown in FIG. 1. As shown in FIG. 2, the power storage module 12 includes an electrode laminate 30 and a resin sealing member 50 that seals the electrode laminate 30.

The electrode laminate 30 is formed by laminating a plurality of bipolar electrodes 32 via a separator 40. In this example, the laminating direction D of the electrode laminate 30 is the Z direction. That is, the laminating direction D coincides with the laminating direction of the power storage module 12. The bipolar electrode 32 includes an electrode plate 34, a positive electrode 36 provided on one surface 34s of the electrode plate 34, and a negative electrode 38 provided on the other surface 34r of the electrode plate 34. The positive electrode 36 is a positive electrode active material layer coated with the positive electrode active material. The negative electrode 38 is a negative electrode active material layer coated with a negative electrode active material. In the electrode laminate 30, the positive electrode 36 of one bipolar electrode 32 faces the negative electrode 38 of one bipolar electrodes 32 adjacent to each other along the laminating direction D with the separator 40 interposed therebetween. In the electrode laminate 30, the negative electrode 38 of one bipolar electrode 32 faces the positive electrode 36 of the other bipolar electrodes 32 adjacent to each other along the laminating direction D with the separator 40 interposed therebetween.

In the electrode laminate 30, a negative terminal electrode 42 is disposed at one end in the laminating direction D, and a positive terminal electrode 44 is disposed at the other end in the laminating direction D. The negative terminal electrode 42 includes the electrode plate 34 and the negative electrode 38 provided on the other surface 34r of the electrode plate 34. The negative electrode 38 of the negative terminal electrode 42 faces the positive electrode 36 of the bipolar electrode 32 at one end in the laminating direction D via the separator 40. One cooling member 14 adjacent to the power storage module 12 is in contact with one surface 34s of the electrode plate 34 of the negative terminal electrode 42. The positive terminal electrode 44 includes an electrode plate 34 and the positive electrode 36 provided on one surface 34s of the electrode plate 34. The other cooling member 14 adjacent to the power storage module 12 is in contact with the other surface 34r of the electrode plate 34 of the positive terminal electrode 44. The positive electrode 36 of the positive terminal electrode 44 faces the negative electrode 38 of the bipolar electrode 32 at the other end in the laminating direction D via the separator 40.

The electrode plate 34 is made of metal and is made of, for example, nickel or a nickel-plated steel plate. The electrode plate 34 is a rectangular metal foil made of, for example, nickel. A peripheral edge portion 34a of the electrode plate 34 has a rectangular frame shape, and is an uncoated region in which the positive electrode active material and the negative electrode active material are not coated. Examples of the positive electrode active material constituting the positive electrode 36 include nickel hydroxide. Examples of the negative electrode active material constituting the negative electrode 38 include a hydrogen storage alloy. In the present embodiment, the formation region of the negative electrode 38 on the other surface 34r of the electrode plate 34 is one size larger than the formation region of the positive electrode 36 on one surface 34s of the electrode plate 34.

The separator 40 is formed in a sheet shape, for example. Examples of the separator 40 include a porous film made of a polyolefin resin such as polyethylene (PE) and polypropylene (PP), a woven fabric made of polypropylene, methylcellulose, or the like, or a non-woven fabric. The separator 40 may be reinforced with a vinylidene fluoride resin compound. The separator 40 is not limited to a sheet shape, and a bag shape may be used.

The sealing member 50 is formed in a rectangular frame shape by, for example, an insulating resin. Examples of the resin material constituting the sealing member 50 include polypropylene (PP), polyphenylene sulfide (PPS), modified polyphenylene ether (modified PPE), and the like. The sealing member 50 is configured to surround the electrode laminate 30 and hold the peripheral edge portion 34a of the plurality of electrode plates 34.

The sealing member 50 has a primary seal 52 provided on the peripheral edge portion 34a and a secondary seal 54 provided around the primary seal 52. The primary seal 52 is a film having a predetermined thickness (length along the laminating direction D). The primary seal 52 has a rectangular frame shape when viewed from the laminating direction D, and is continuously welded over the entire circumference of the peripheral edge portion 34a by, for example, ultrasonic waves or heat. The primary seal 52 is provided on the peripheral edge portion 34a in a state where the peripheral edge portion 34a is embedded, and covers an end surface of the electrode plate 34. The primary seal 52 is provided apart from the positive electrode 36 and the negative electrode 38 when viewed from the laminating direction D. The primary seals 52 adjacent to each other along the laminating direction D may abut each other or may be provided apart from each other.

The secondary seal 54 is provided outside the electrode laminate 30 and the primary seal 52, and constitutes an outer wall (housing) of the power storage module 12. The secondary seal 54 is formed, for example, by injection molding of a resin, and extends over the entire length of the electrode laminate 30 in the laminating direction D. The secondary seal 54 has a tubular shape (frame shape) extending along the laminating direction D. The secondary seal 54 covers an outer surface of the primary seal 52 along the laminating direction D. The secondary seal 54 is joined to the outer surface of the primary seal 52 and seals the outer surface of the primary seal 52. The secondary seal 54 is welded to the outer surface of the primary seal 52, for example, by heat during injection molding. The secondary seal 54 may be welded to the outer surface of the primary seal 52 by hot plate welding.

An internal space V that is airtightly and watertightly partitioned by the electrode plate 34 and the sealing member 50 is formed between the electrode plates 34 adjacent to each other along the laminating direction D. In other words, one internal space V is defined by a pair of electrode plates 34 adjacent to each other along the laminating direction D. In the following, a portion including a pair of electrode plates 34 adjacent to each other along the laminating direction D and one internal space V defined by the pair of electrode plates 34 may be referred to as a power storage cell 39.

The internal space V contains an electrolyte (not shown) made of an alkali solution such as an aqueous solution of potassium hydroxide. That is, the power storage module 12 includes a plurality of power storage cells 39 laminated on each other and the electrolyte disposed in each internal space V of the power storage cells 39. The electrolyte is impregnated in the separator 40, the positive electrode 36, and the negative electrode 38. Since the electrolyte is strongly alkaline, the sealing member 50 is made of a resin material having strong alkali resistance.

Figure 3:
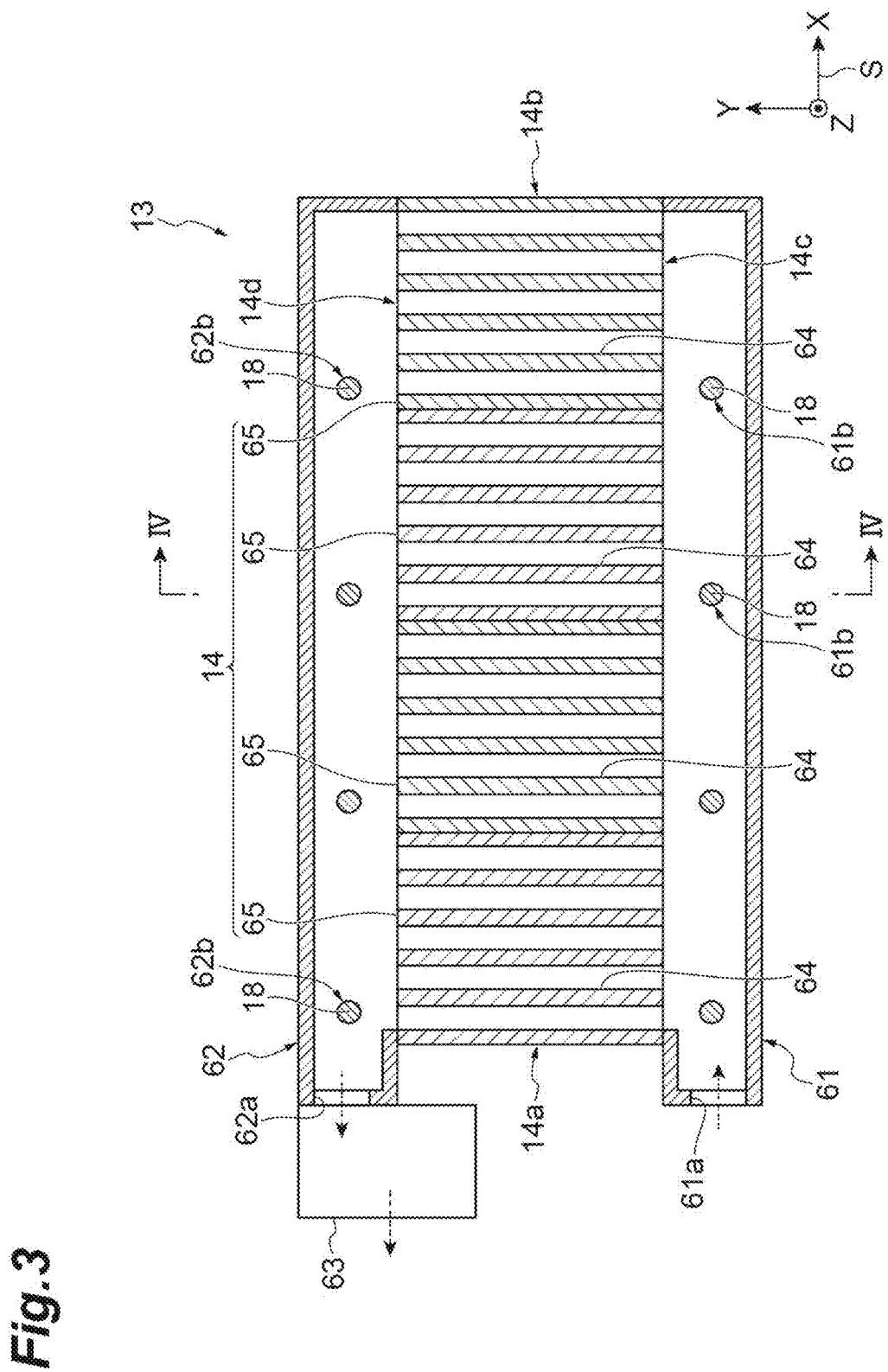
FIG. 3 is a cross-sectional view taken along the line III-III in FIG. 1.
Figure 4:
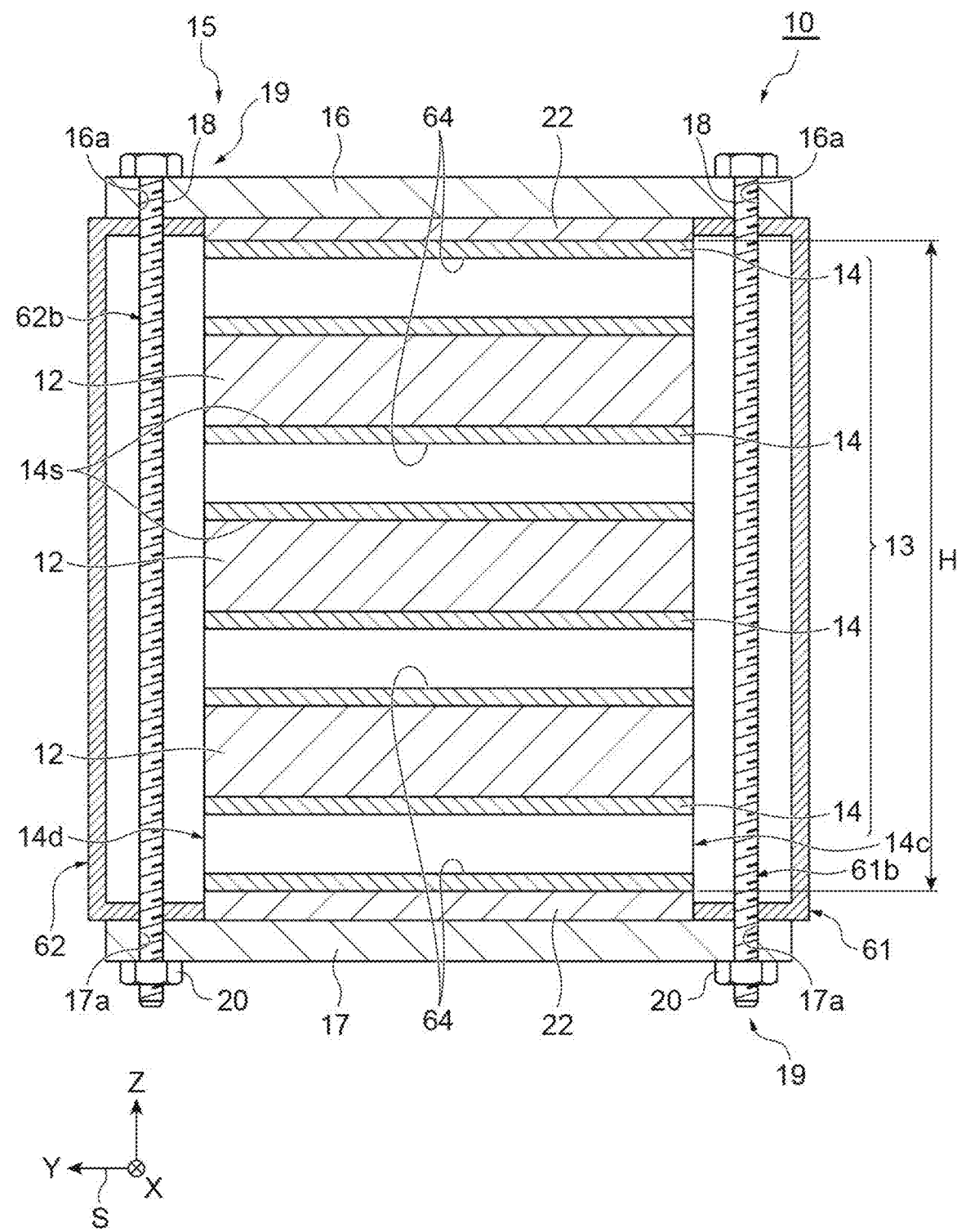
FIG. 4 is a cross-sectional view taken along line IV-IV in FIG. 3.

Subsequently, the detailed configuration of the cooling mechanism 13 for cooling the power storage module 12 will be described. FIG. 3 is a cross-sectional view taken along the line III-III in FIG. 1. FIG. 4 is a cross-sectional view taken along line IV-IV in FIG. 3. In FIG. 3, the power storage module 12 and the restraining member 15 are not shown. As shown in FIG. 3 and FIG. 4, the cooling mechanism 13 includes the above-described cooling member 14, the lead-in duct 61, the lead-out duct 62, and a blower 63.

The cooling member 14 releases the heat generated by the power storage module 12 to the outside by allowing a cooling medium to flow inside the cooling member 14, and cools the power storage module 12. That is, the cooling member 14 has not only a function as a connecting member for electrically connecting the power storage modules 12 to each other, but also a function as a heat radiating plate for radiating the heat generated by the power storage module 12. As the cooling medium, for example, a gas such as air or ammonia is used as a heat medium having an insulating property. When a circulation pump is used instead of the blower 63, a liquid such as an insulating coolant can be used as the cooling medium.

The cooling member 14 has a rectangular plate shape, and is disposed such that the thickness direction is along the laminating direction (that is, the Z direction). The cooling member 14 has a pair of main surfaces 14s (that is, a pair of main surfaces 14s along the first direction (here, Y direction) and the second direction (here, X direction) intersecting (orthogonal) in the laminating direction. Each main surface 14s has a long shape with the second direction as a longitudinal direction. In addition, a length of each main surface 14s along the first direction is, for example, about the same as a length of the power storage module 12 along the first direction. Each main surface 14s constitutes a cooling surface that faces the power storage module 12 along the laminating direction and is thermally connected (for example, in contact with the power storage module 12) to the power storage module 12. The present embodiment, the entire surface of the main surface 14s constitutes the cooling surface.

As described above, the cooling member 14 is formed with a plurality of flow paths 64. The plurality of flow paths 64 allows the cooling medium to flow along the main surface 14s. Therefore, the plurality of flow paths 64 extend linearly along the first direction (here, the Y direction), and are arranged along the second direction (here, the X direction) intersecting (orthogonal to) the first direction. In the present embodiment, the arrangement direction of the plurality of flow paths 64 and the longitudinal direction of the main surface 14s of the cooling member 14 coincide with each other. The plurality of flow paths 64 are parallel to each other. The cross section intersecting (orthogonal) in the first direction of the flow path 64 (hereinafter, referred to as "flow path cross section") is rectangular in the shown example, but may have another shape such as a circle. The area of the flow path cross section of each flow path 64 (hereinafter, referred to as "flow path area") is constant along, for example, the first direction. Further, all the flow paths 64 formed in the cooling member 14 have, for example, the same flow path area as each other.

The cooling member 14 has a plurality of (for example, four) cooling plates 65 in which the flow path 64 is formed. Each of the plurality of cooling plates 65 is formed with a part of the plurality of flow paths 64 in one cooling member 14. In the drawing, the plurality of flow paths 64 are formed in one cooling plate 65, but only one flow path 64 may be formed in one cooling plate 65. The plurality of cooling plates 65 are arranged along the second direction. As a result, the plurality of cooling plates 65 constitute the cooling member 14 as a whole. One main surface 14*s* (cooling surface) is configured by a plurality of cooling plates 65.

The lead-in duct 61 leads a cooling medium into each flow path 64. The lead-in duct 61 is disposed at one end portion 14*c* of the cooling member 14 in the first direction. The lead-in duct 61 is provided to extend along the second direction with respect to one end portion 14*c*. The lead-in duct 61 has a rectangular shape and is formed of, for example, a bent metal plate.

A length of the lead-in duct 61 along the second direction is larger than the entire length of the cooling member 14 along the second direction. A width of the lead-in duct 61 along the first direction is constant, for example, along the second direction. The lead-in duct 61 communicates with all the flow paths 14 of the cooling member 64. In addition, a length of the lead-in duct 61 along the laminating direction is larger than a laminating height H of the power storage modules 12 and the cooling members 14 laminated on each other. In the present embodiment, the lead-in duct 61 communicates with all the flow paths 64 of all the cooling members 14. A duct wall member 61*c* is provided to collectively cover the power storage module 12 and the cooling member 14 laminated on each other from one side (one end portion 14*c* side of the cooling member 14) in the first direction.

The lead-in duct 61 is provided with a lead-in port 61*a* for leading a cooling medium into the lead-in duct 61. The lead-in port 61*a* is located on the one end portion 14*a* side of the cooling member 14. Specifically, the lead-in port 61*a* is provided at a position protruding from one end portion 14*a* along the second direction.

Here, the plurality of restraining bolts 18 (all for fastening the end plates 16 and 17) includes a plurality of lead-in side bolts 61*b* (first fastening member) disposed at one end portion of the end plates 16 and 17 in the first direction. The plurality of lead-in side bolts 61*b* are arranged along the second direction on the one end portion 14*c* side of the cooling member 14. The plurality of lead-in side bolts 61*b* penetrate the lead-in duct 61 along the laminating direction. Each of the plurality of lead-in side bolts 61*b* extends along the laminating direction to pass through the inside of the lead-in duct 61. The area of the end plates 16 and 17 in the present embodiment is smaller than the area of the cooling mechanism 13 seen from the laminating direction defined by the lead-in duct 61 and the lead-out duct 62.

Inside the lead-in duct 61, there are the plurality of lead-in side bolts 61*b* arranged along the second direction. As described above, the plurality of lead-in side bolts 61*b* extend along the laminating direction. In addition, at least a part of the lead-in side bolts 61*b* is located to overlap with at least one of the power storage module 12 and the cooling member 14 when viewed from the first direction. In the present embodiment, the plurality of lead-in side bolts 61*b* are located to overlap all of the laminated power storage modules 12 and the cooling member 14 when viewed from the first direction. As an example, each of the plurality of lead-in side bolts 61*b* is located substantially in the center of the first direction inside the lead-in duct 61. Further, the plurality of lead-in side bolts 61*b* may have different shapes at least in the lead-in duct 61, but as an example, the plurality of lead-in side bolts 61*b* and the lead-in duct 61 have the same shape (here, a rod shape).

The lead-out duct 62 allows the cooling medium led out of the flow path 64 to flow. The lead-out duct 62 is disposed at the other end portion 14*d* of the cooling member 14 in the first direction. The lead-out duct 62 is provided to extend along the second direction with respect to the other end portion 14*d* of the cooling member 14 in the first direction. The lead-out duct 62 has a rectangular shape and is formed of, for example, a bent metal plate.

A length of the lead-out duct 62 along the second direction is larger than the entire length of the cooling member 14 along the second direction. A width of the lead-out duct 62 along the first direction is constant, for example, along the second direction. The lead-out duct 62 communicates with all the flow paths 14 of the cooling member 64. In addition, a length of the lead-out duct 62 along the laminating direction is larger than a laminating height H of the power storage modules 12 and the cooling members 14 laminated on each other. In the present embodiment, the lead-out duct 62 communicates with all the flow paths 64 of all the cooling members 14. A duct wall member 62*c* is provided to collectively cover the power storage module 12 and the cooling member 14 laminated on each other from the other side (the other end portion 14*d* side of the cooling member 14) in the first direction.

The lead-out duct 62 is provided with a lead-out port 62*a* for leading the cooling medium out of the lead-out duct 62. The lead-out port 62*a* is located on the one end portion 14*a* side of the cooling member 14. Specifically, the lead-out port 62*a* is provided at a position protruding from one end portion 14*a* along the second direction.

In addition, the plurality of restraining bolts 18 (all for fastening the end plates 16 and 17) are a plurality of lead-out side bolts 62*b* (second fastening member) disposed at the other end portion of the end plates 16 and 17 in the first direction. The plurality of lead-out side bolts 62*b* are arranged along the second direction on the other end portion 14*d* side of the cooling member 14. The plurality of lead-out side bolts 62*b* penetrate the lead-out duct 62 along the laminating direction. Each of the plurality of lead-out side bolts 62*b* extends along the laminating direction to pass through the inside of the lead-out duct 62.

Inside the lead-out duct 62, there are the plurality of lead-out side bolts 62*b* arranged along the second direction. As described above, the plurality of lead-out side bolts 62*b* extend along the laminating direction. In addition, at least a part of the plurality of the lead-out side bolts 62*b* is located to overlap with at least one of the power storage module 12 and the cooling member 14 when viewed from the first direction. In the present embodiment, the lead-out side bolt 62*b* is located to overlap all of the laminated power storage modules 12 and the cooling member 14 when viewed from the first direction. As an example, each of the plurality of lead-out side bolt 62*b* is located substantially in the center of the first direction inside the lead-out duct 62. The plurality of lead-out side bolt 62*b* may have different shapes at least in the lead-out duct 62, but as an example, they have the same shape (here, a rod shape). Further, a configuration of the plurality of lead-out side bolts 62*b* may be the same as or different from a configuration of the plurality of lead-in side bolts 61*b*.

In the present embodiment, the plurality of lead-in side bolts 61*b* and the plurality of lead-out side bolt 62*b* are configured in the same manner as each other. Specifically, the lead-in side bolt 61*b* and the lead-out side bolt 62*b* are arranged at constant spaces along the second direction on each of the one end portion 14c side and the other end portion 14d side of the cooling member 14.

The blower 63 is connected to the lead-out port 62a. The blower 63 sucks the cooling medium inside the lead-out duct 62 from the lead-out port 62a, and discharges the cooling medium from the lead-out duct 62 to the outside. Further, by suction of the cooling medium from the lead-out port 62a by the blower 63, the external cooling medium is sucked from the lead-in port 61a to the inside of the lead-in duct 61, and the cooling medium flows through the lead-in duct 61, the plurality of flow paths 64, and the lead-out duct 62.

Figure 5:
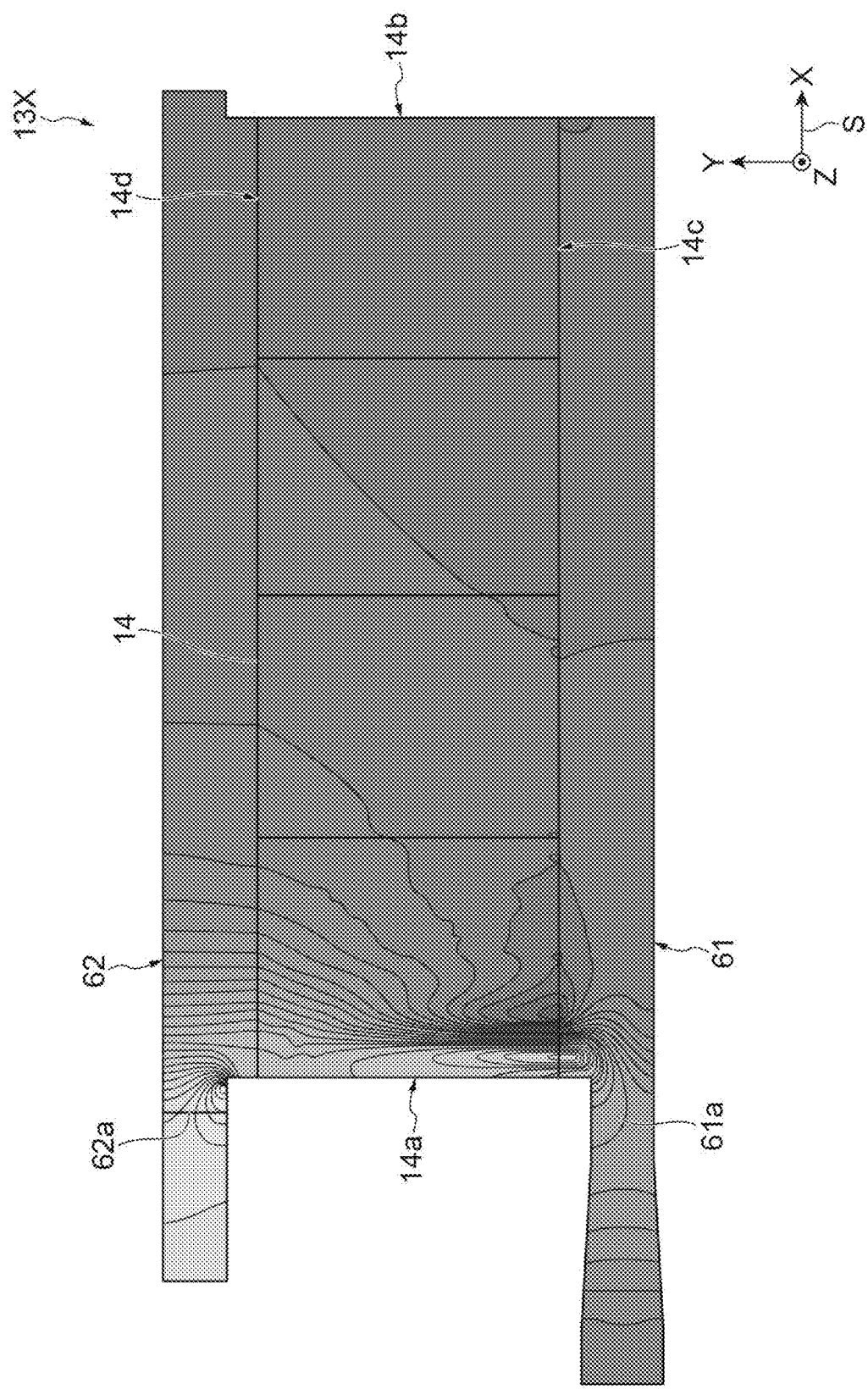
FIG. 5 is a diagram showing a pressure distribution state of a cooling mechanism according to a comparative example.
Figure 6:
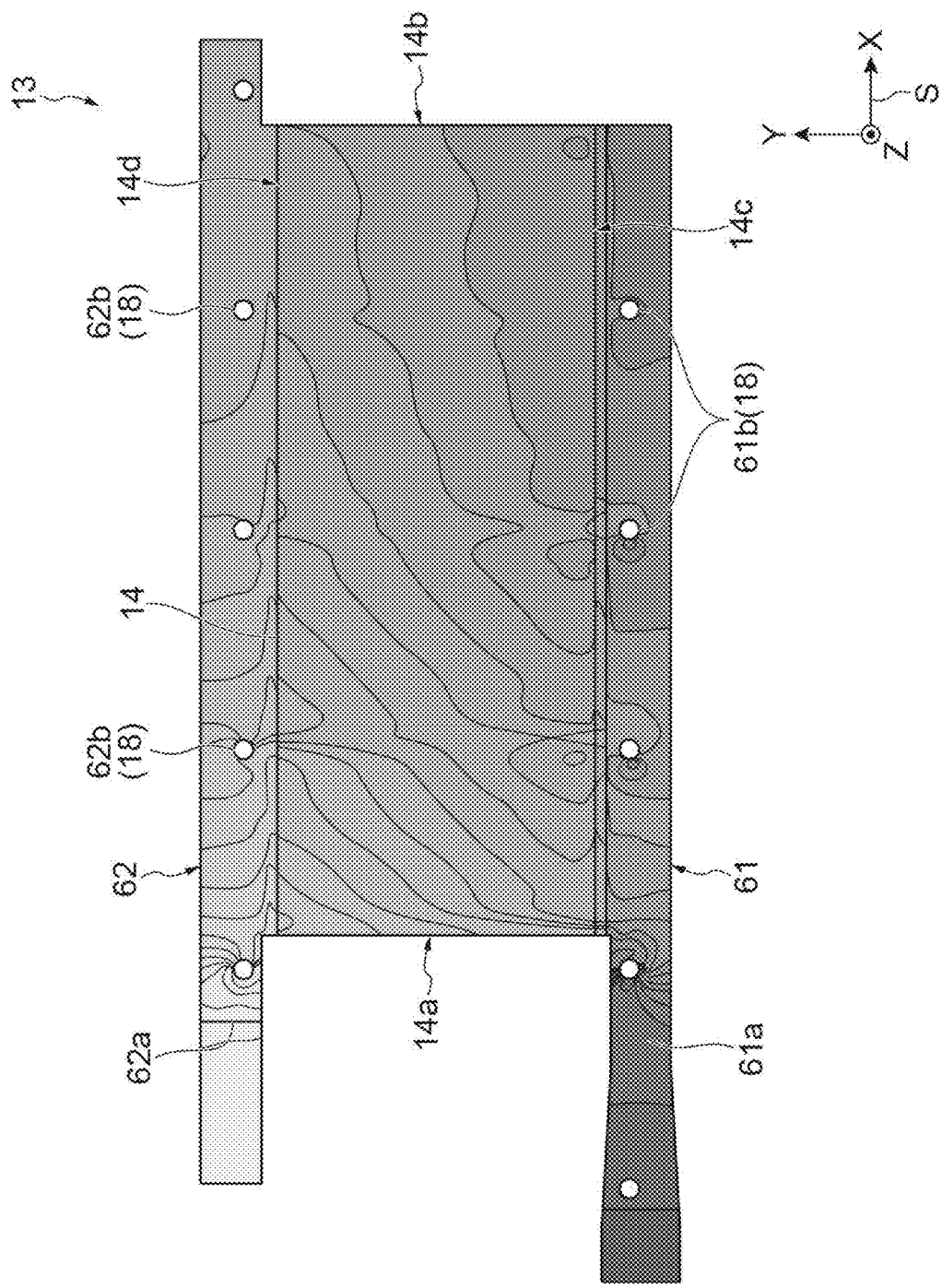
FIG. 6 is a diagram showing a pressure distribution state of a cooling mechanism according to the present embodiment.

The operation and effect of the power storage device 10 described above will be described. FIG. 5 is a diagram showing a pressure distribution state of a cooling mechanism according to a comparative example. FIG. 6 is a diagram showing a pressure distribution state of a cooling mechanism according to the present embodiment. A cooling mechanism 13X according to the comparative example shown in FIG. 5 differs from the cooling mechanism 13 according to the present embodiment in that the plurality of lead-in side bolts 61b are not disposed inside the lead-in duct 61 and the plurality of lead-out side bolts 62b are not disposed inside the lead-out duct 62, and is configured similarly to the cooling mechanism 13 in other aspects. In the cooling mechanism 13X, the inside of the lead-in duct 61 and the inside of the lead-out duct 62 are empty.

In FIG. 5 and FIG. 6, the pressure is indicated by contour lines, and the darker the color, the greater the pressure. In the cooling mechanisms 13 and 13X, the narrower a space between the pressure contour lines, the easier the cooling medium flows, and the wider the space between the pressure contour lines, the more difficult the cooling medium flows.

In the power storage device 10, the plurality of flow paths 64 formed in the cooling member 14 are arranged along the second direction (here, the X direction), and the lead-in duct 61 is disposed to extend from one end portion 14c of the cooling member 14 in the first direction along the second direction. In such a configuration, when the inside of the lead-in duct 61 is empty as in the cooling mechanism 13X, as shown in FIG. 5, the variation of the space between the contour lines becomes large for each position, and the flow of the cooling medium led from the lead-in port 61a tends to be biased in one direction (second Direction) in the inside of the lead-in duct 61. In this case, the ease of inflow of the cooling medium varies depending on a position of the flow path 64.

On the other hand, in the cooling mechanism 13 of the power storage device 10 according to the present embodiment, a plurality of lead-in side bolts 61b arranged along the second direction are present inside the lead-in duct 61. Specifically, each of the parts of the restraining bolts 18 disposed at one end portion of the end plates 16 and 17 in the first direction is extended along the laminating direction as the lead-in side bolts 61b to pass through the inside of the lead-in duct 61. Therefore, the flow of the cooling medium flowing through the inside of the lead-in duct 61 is blocked (disturbed) by each lead-in side bolt 61b, and is made uniform in the lead-in duct 61. As a result, as shown in FIG. 6, the space between the contour lines becomes substantially even over the entire area of the cooling member 14. In other words, the cooling medium tends to flow into each flow path 64 regardless of the position in the second direction. Accordingly, as compared with a configuration of the cooling mechanism 13X in which the flow of the cooling medium is not blocked over the entire length of the lead-in duct 61 in the second direction, the bias in the flow of the cooling medium between the plurality of flow paths 64 in the cooling member 14 is suppressed, and the variation of the cooling performance for each position can be suppressed.

By the way, the power storage module 12 is restrained by the fastening member 19 (restraining bolt 18 and nut 20) via a pair of end plates 16 and 17 sandwiching the power storage module 12. At this time, in order to avoid interference between the lead-in duct 61 and the restraining bolt 18, for example, when the restraining bolt 18 is disposed outside the lead-in duct 61, the end plates 16 and 17 having a size corresponding to a position of the restraining bolt 18 are required, which may cause an increase in the size of the end plates 16 and 17.

On the other hand, according to the power storage device 10, the size of the end plates 16 and 17 can be reduced as compared with when the plurality of restraining bolts 18 are disposed outside the lead-in duct 61, and the restraining bolts 18 can also be utilized as a member for appropriately disturbing the flow of the cooling medium flowing through the inside of the lead-in duct 61 and reducing the unbalance of the flow with respect to a distance from the lead-in port 61a of the cooling medium flowing through each flow path 64.

In addition, in the power storage device 10, a plurality of lead-out side bolts 62b arranged along the second direction are present inside the lead-out duct 62. Specifically, the power storage device 10 further includes the lead-out duct 62 disposed at the other end portion 14d of the cooling member 14 in the first direction and allowing the cooling medium led out of each of the plurality of flow paths 64 to flow. The plurality of restraining bolt 18 include the plurality of lead-out side bolts 62b arranged along the second direction on the other end portions of the end plates 16 and 17 in the first direction, and each of the plurality of lead-out side bolts 62b extend along the laminating direction to pass through the inside of the lead-out duct 62. As a result, the spaces between the contour lines inside the lead-out duct 62 of the cooling mechanism 13 are made uniform. That is, the bias of the flow of the cooling medium is suppressed inside the lead-out duct 62. Accordingly the bias of the cooling medium from each flow path 64 led to the lead-out duct 62 is easily suppressed, and the variation of the cooling performance for each position can be further suppressed.

The above-described embodiment describes one embodiment of the power storage device according to the present disclosure. The power storage device according to the present disclosure may randomly change the above-described power storage device 10.

For example, in the above embodiment, each of the plurality of lead-in side bolts 61b and the plurality of lead-out side bolts 62b are arranged at constant spaces along the second direction, respectively. However, a space between the lead-in side bolts 61b along the second direction and a space between the lead-out side bolts 61b along the second direction do not have to be constant. The plurality of lead-in side bolts 61b may be disposed such that the space between the lead-in side bolts 61b adjacent to each other along the second direction increases as a distance from the lead-in port 61a increases (that is, toward the other end portion 14b of the cooling member 14). In this case, in the configuration in which the lead-in port 61a and the lead-out port 62a are located on the same end portion (here, the other end portion 14b) side of the cooling member 14 in the second direction, the bias of the flow of the cooling medium between the plurality of flow paths 64 in the cooling member 14 can be further suppressed.

Similarly, from the viewpoint of further suppressing the bias of the flow of the cooling medium between the plurality of flow paths 64, the plurality of lead-out side bolts 62b may be disposed such that the space between the lead-out side bolts 62b adjacent to each other along the second direction increases as the distance from the lead-out port 62a increases.

The plurality of lead-in side bolts 61b may be disposed such that the space between the lead-in side bolts 61b adjacent to each other along the second direction increases as a distance from the lead-in port 61a increases. Even in this case, since the flow of the cooling medium flowing through the inside of the lead-in duct 61 is blocked by the lead-in side bolt 61b (disturbed), it is effective to suppress the variation of the cooling performance of the cooling member 14 for each position. Similarly, the plurality of lead-out side bolts 62b may be disposed such that the space between the lead-out side bolts 62b adjacent to each other increases along the second direction toward one end portion 14a of the cooling member 14.

Figure 7:
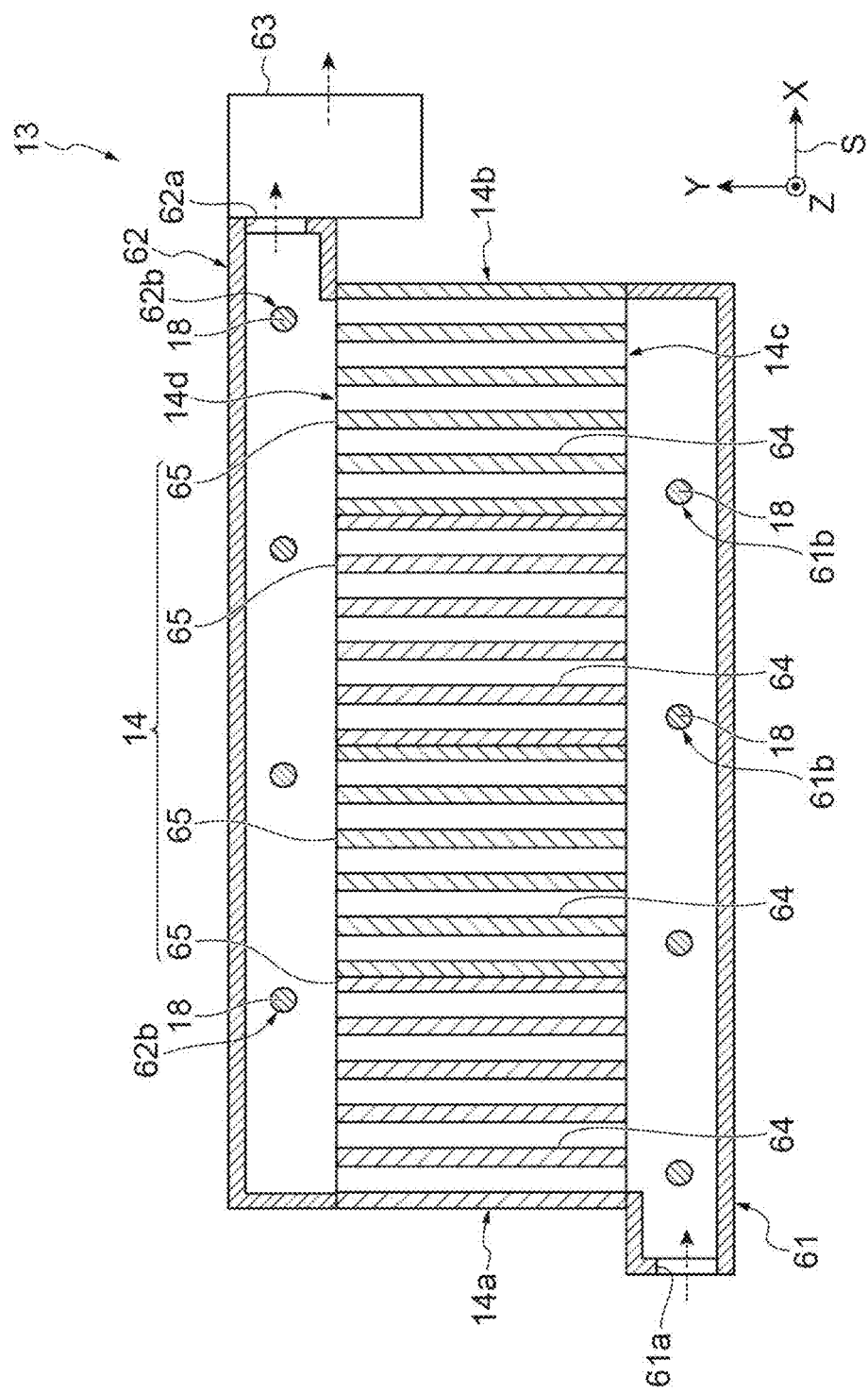
FIG. 7 is a cross-sectional view showing a cooling mechanism according to a modification example.

In addition, the lead-in port 61a and the lead-out port 62a do not have to be located on the same end portion (here, the other end portion 14b) side of the cooling member 14 in the second direction. FIG. 7 is a cross-sectional view showing a cooling mechanism according to a modification example. As shown in FIG. 7, in the cooling mechanism 13, the lead-in port 61a is located on the one end portion 14a side of the cooling member 14, and the lead-out port 62a may be located on the other end portion 14b side of the cooling member 14. Even in this case, since the flow of the cooling medium flowing through the inside of the lead-in duct 61 is blocked by the lead-in side bolt 61b (disturbed), it is effective to suppress the variation of the cooling performance of the cooling member 14 for each position.

Figure 8:
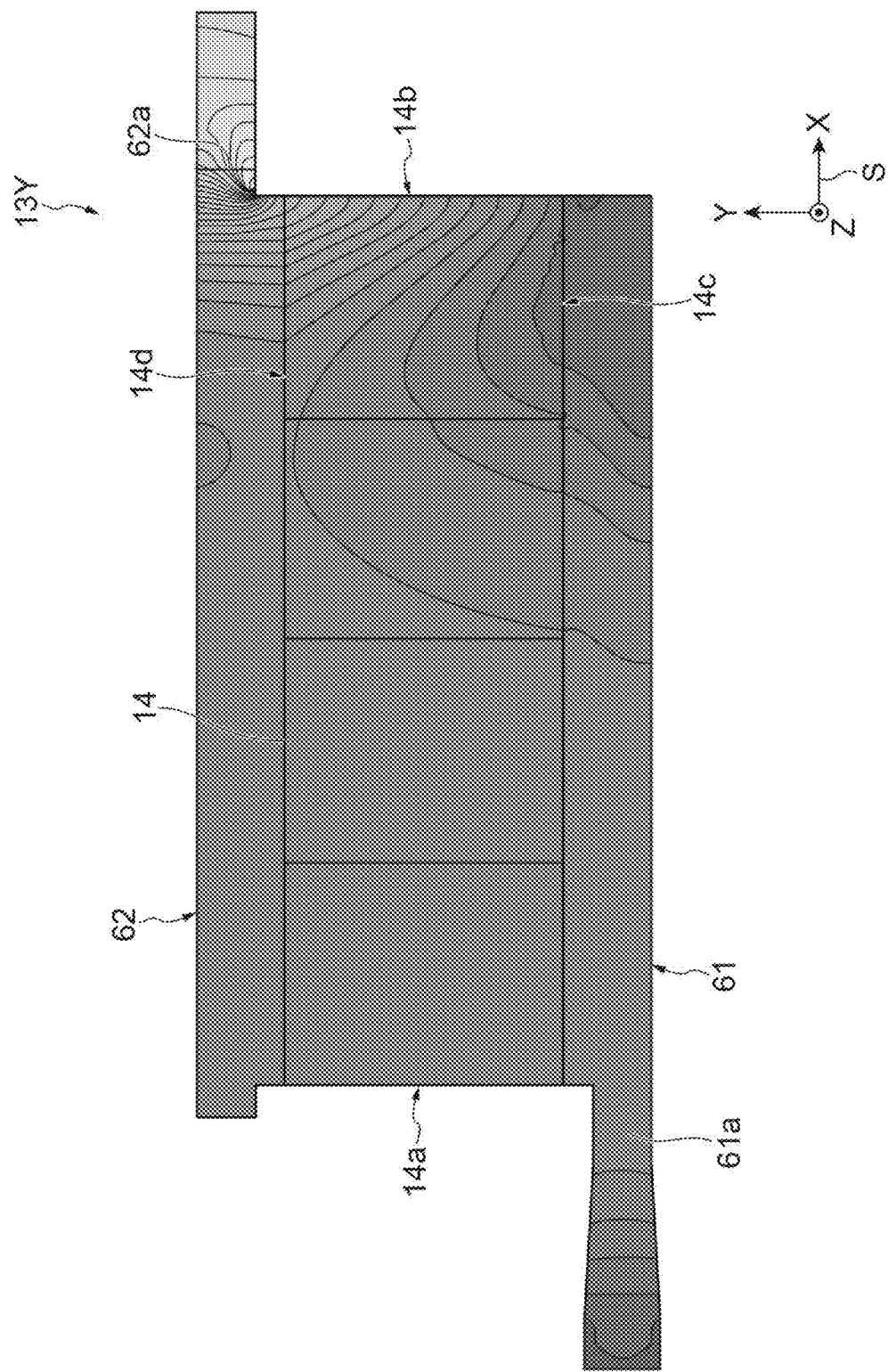
FIG. 8 is a diagram showing a pressure distribution state of a cooling mechanism according to another comparative example.
Figure 9:
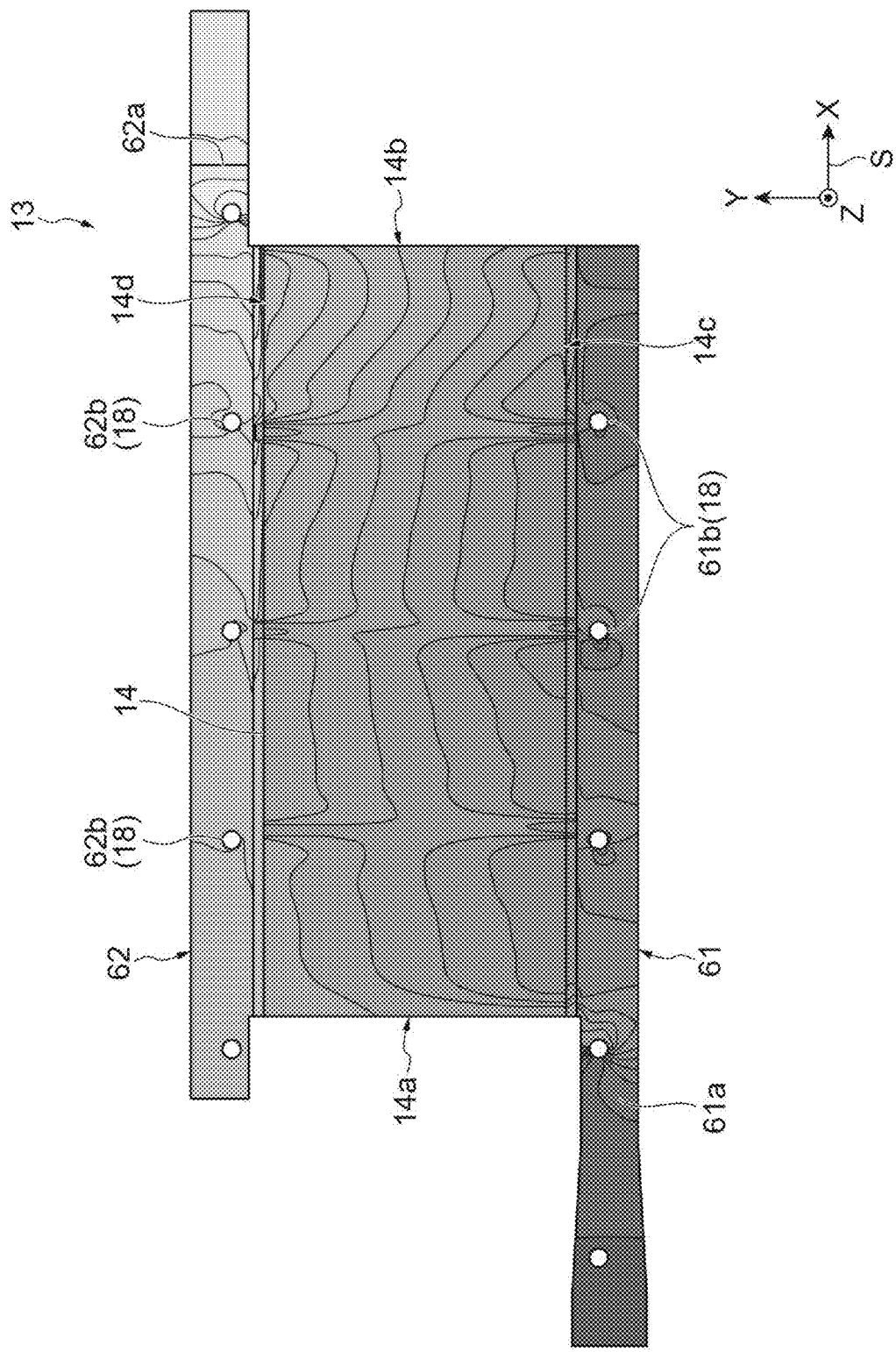
FIG. 9 is a diagram showing a pressure distribution state of a cooling mechanism according to a modification example.

FIG. 8 is a diagram showing a pressure distribution state of a cooling mechanism according to another comparative example different from the cooling mechanism 13X. FIG. 9 is a diagram showing a pressure distribution state of a cooling mechanism according to a modification example. A cooling mechanism 13Y shown in FIG. 8 is a comparative example corresponding to the cooling mechanism 13 according to the modification example shown in FIG. 7. The cooling mechanism 13Y differs from the cooling mechanism 13 according to the modification example in that the plurality of lead-in side bolts 61b are not disposed inside the lead-in duct 61 and the plurality of lead-out side bolts 62b are not disposed inside the lead-out duct 62, and is configured similarly to the cooling mechanism 13 in other aspects. In the cooling mechanism 13Y, as in the cooling mechanism 13 X, the inside of the lead-in duct 61 and the inside of the lead-out duct 62 are empty.

In FIG. 8 and FIG. 9, as in FIG. 5 and FIG. 6, the pressure is indicated by contour lines, and the darker the color, the greater the pressure. That is, in the cooling mechanisms 13 and 13Y, the narrower a space between the pressure contour lines, the easier the cooling medium flows, and the wider the space between the pressure contour lines, the more difficult the cooling medium flows.

As shown in FIG. 8, in the cooling mechanism 13Y, the variation of the space between the contour lines for each position is large. Therefore, the ease of inflow of the cooling medium varies depending on the position of the flow path 64. On the other hand, in the cooling mechanism 13 according to this modification example, as shown in FIG. 9, the space between the contour lines becomes substantially even over the entire area of the cooling member 14. Accordingly, the cooling medium can easily flow into each of the flow paths 64 regardless of the position in the second direction, and the variation of the cooling performance for each position can be suppressed.

In the cooling mechanism 13 according to the present modification example, the plurality of lead-in side bolts 61b may be disposed such that the space between the lead-in side bolts 61b adjacent to each other along the second direction decreases as a distance from the lead-in port 61a increases. In this case, in the configuration in which the lead-in port 61a and the lead-out port 62a are located at the end portion sides different from each other of the cooling member 14 in the second direction, the bias of the flow of the cooling medium between the plurality of flow paths 64 in the cooling member 14 can be further suppressed.

In the cooling mechanism 13 according to the present modification example, the plurality of lead-out side bolts 62b may be disposed such that the space between the lead-out side bolts 62b adjacent to each other along the second direction increases as a distance from the lead-out port 62a increases (that is, toward one end portion 14a of the cooling member 14). In this case, the bias of the flow of the cooling medium between the plurality of flow paths 64 in the cooling member 14 can be further suppressed.

In the cooling mechanism 13 according to the present modification example, the plurality of lead-in side bolts 61b may be disposed such that the space between the lead-in side bolts 61b adjacent to each other along the second direction increases toward one end portion 14a of the cooling member 14, and the plurality of lead-out side bolts 62b may be disposed such that the space between the lead-out side bolts 62b adjacent to each other along the second direction increases toward the other end portion 14b of the cooling member 14.

Figure 10:
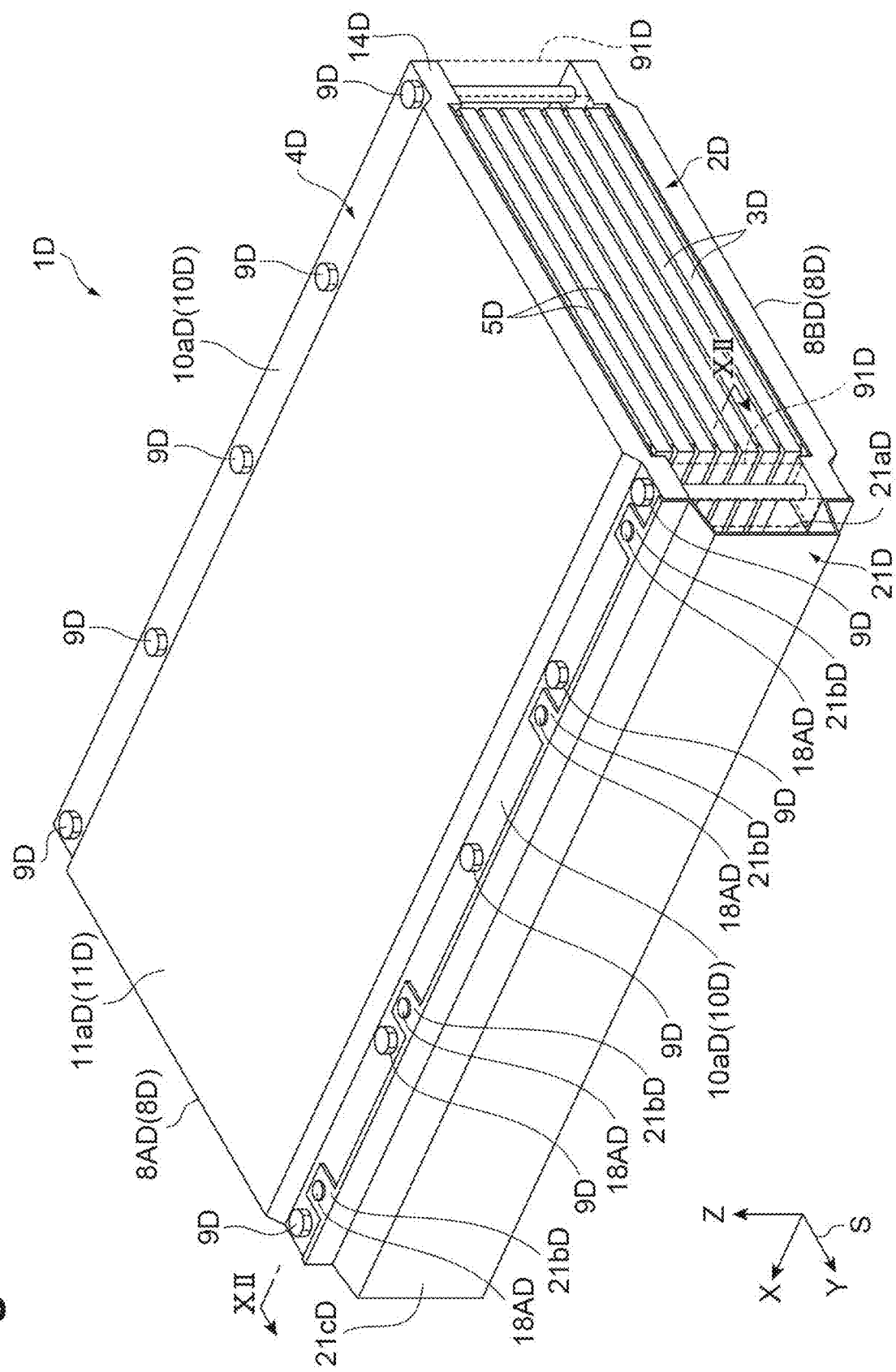
FIG. 10 is a schematic perspective view showing a power storage device according to another embodiment.
Figure 11:
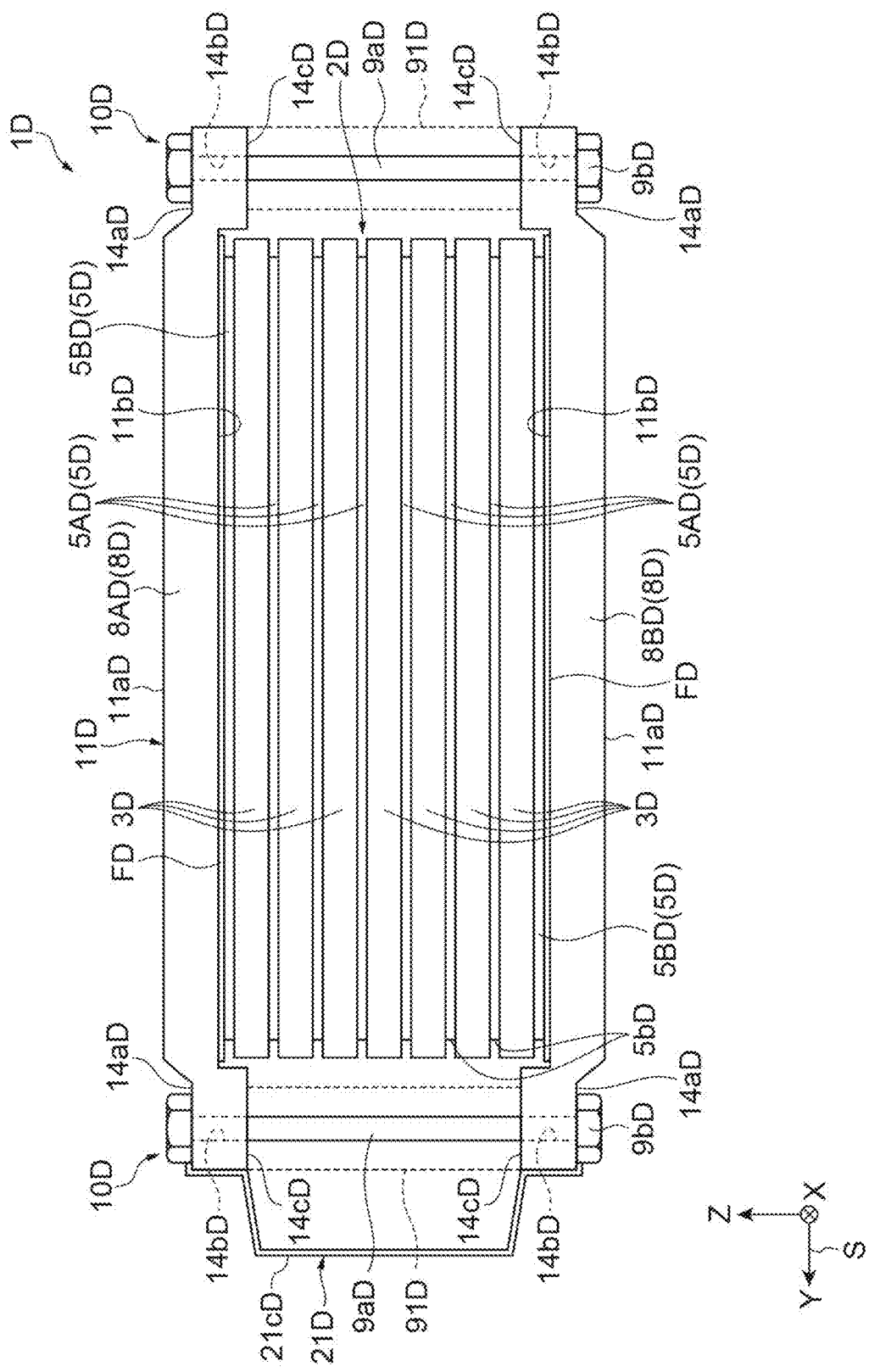
FIG. 11 is a side view of the power storage device shown in FIG. 10.
Figure 12:
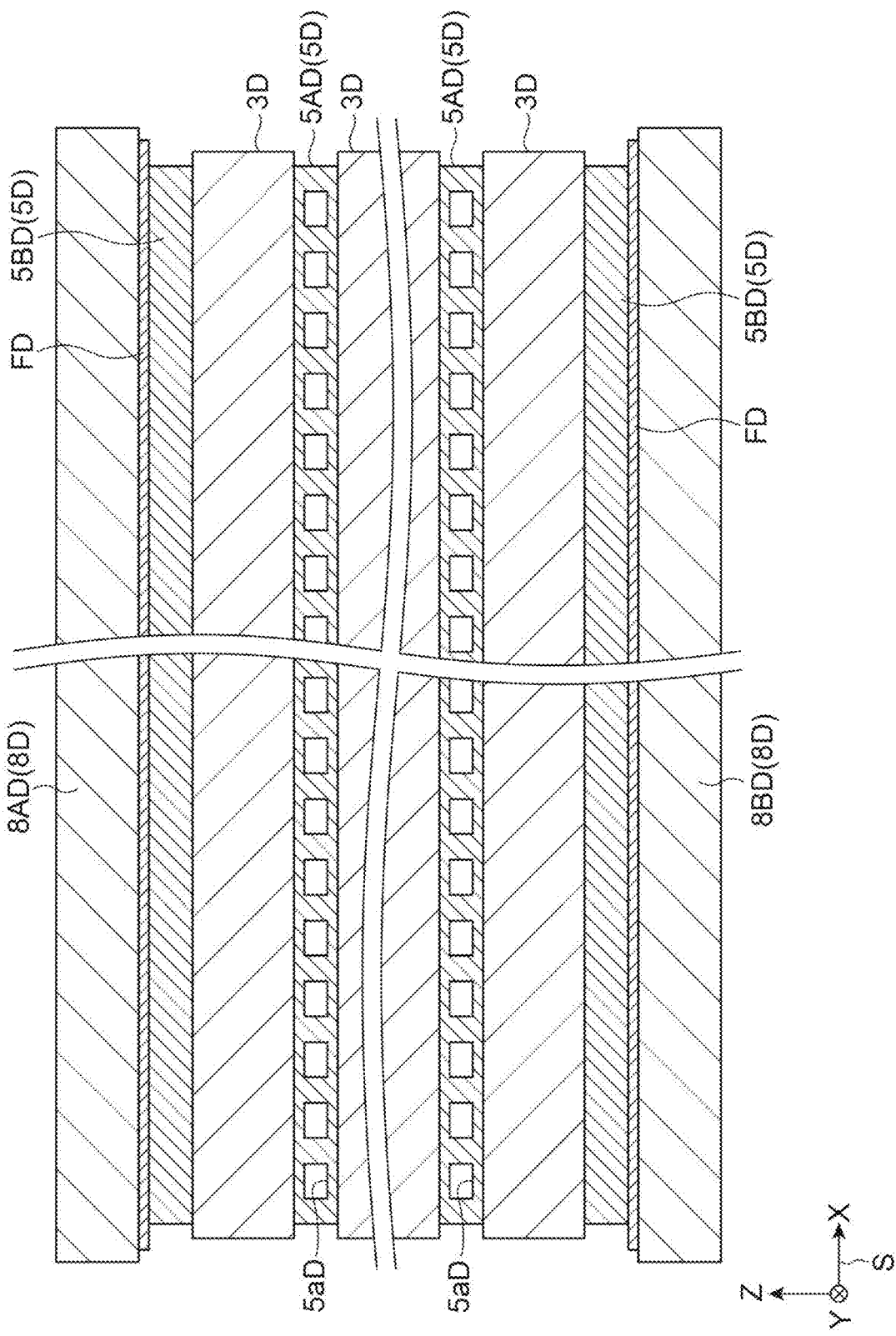
FIG. 12 is a cross-sectional view taken along line XII-XII in FIG. 10.

The power storage device according to another embodiment will be described with reference to FIG. 10 to FIG. 12. FIG. 10 is a perspective view of a power storage device according to another embodiment. FIG. 11 is a side view of the power storage device shown in FIG. 10, FIG. 11 shows a power storage device viewed from the second direction, FIG. 12 is a cross-sectional view taken along line XII-XII in FIG. 10. A power storage device 1D shown in FIG. 10 is, as in the power storage device 10, used as a battery for various vehicles such as forklifts, hybrid vehicles, and electric vehicles. The power storage device 1D includes a module laminate 2D and a restraining member 4D. The module laminate 2D includes a plurality of power storage modules 3D laminated in one direction. The laminating direction of the power storage module 3D in the present embodiment is, for example, the same as the laminating direction (that is, the Z direction) of the power storage module 12 described above.

The module laminate 2D includes a plurality of (seven in the present embodiment) power storage modules 3D and a plurality of (eight in the present embodiment) conductive plates 5D. The power storage module 3D is a bipolar battery having, for example, a rectangular shape when viewed from the laminating direction, and including a plurality of bipolar electrodes (for example, the bipolar electrodes 32 described above). The power storage module 3D may be a secondary battery such as a nickel hydrogen secondary battery or a lithium ion secondary battery, but may be an electric double layer capacitor. In the following explanation, a nickel hydrogen secondary battery will be exemplified.

The power storage modules 3D adjacent to each other in the laminating direction are electrically connected to each other via the conductive plate 5D. In the present embodiment, the plurality (8) of conductive plates 5D are composed of a plurality (6) of conductive plates 5AD and a plurality (2) of conductive plates 5BD (conductive members). The conductive plate 5AD is an example of a cooling member. The conductive plates 5AD are disposed between the power storage modules 3D adjacent to each other in the laminating direction. The conductive plate 5BD is disposed outside the laminating direction of the power storage modules 3D located at the laminated end of the plurality of power storage modules 3D. An electrode terminal (one of the positive electrode terminal 24 according to the above embodiment and the negative electrode terminal 26 according to the above embodiment) may be connected to each conductive plate 5BD.

As shown in FIG. 12, a plurality of flow paths 5aD for allowing the cooling medium to flow are provided inside the conductive plate 5AD. Each of the plurality of flow paths 5aD extends along the first direction (here, the Y direction) intersecting (orthogonal to) the laminating direction (here, the Z direction), and is disposed along a second direction (here, the X direction) intersecting (orthogonal to) the laminating direction and the first direction. The conductive plate 5AD functions as a heat radiating plate that radiates heat generated by the power storage module 3D by allowing a cooling medium to flow in the flow path 5aD. The conductive plate 5D has, for example, a rectangular shape when viewed from the laminating direction. In the example of FIG. 10, the area of the conductive plate 5D viewed from the laminating direction is smaller than the area of the power storage module 3D, but from the viewpoint of improving heat radiation, the area of the conductive plate 5D may be the same as the area of the power storage module 3D, and may be larger than the area of the power storage module 3D.

As shown in FIG. 10 and FIG. 11, the power storage device 1D has a lead-in duct 21D for allowing a cooling medium to flow for cooling the power storage module 3D. The lead-in duct 21D is disposed at one end portion 5bD of the conductive plate 5AD in the first direction. The lead-in duct 21D is provided to face the one end portion 5bD of each conductive plate 5AD in the first direction and extend along the second direction. The lead-in duct 21D has, for example, a rectangular shape. The lead-in duct 21D is formed by a duct wall member 21cD which is a bent metal plate to have a U shape when viewed from the second direction, and one edge portion 10D (edge portion 10D of the conductive plate 5AD on the side of one end portion 5bD) of each of a pair of restraining plates 8D described later. The lead-in duct 21D is configured to allow the cooling medium to flow and lead the cooling medium into each of the plurality of flow paths 5aD.

At one end of the lead-in duct 21D in the second direction, a lead-in port 21aD for leading a cooling medium into the lead-in duct 21D is provided. The power storage device 1D does not include a lead-out duct for allowing the cooling medium led out of the flow path 5aD to flow. The cooling medium lead from the lead-in duct 21D into one end portion of the flow path 5aD flows through the flow path 5aD and is led out from the other end portion of the flow path 5aD to the external space. A blower fan (not shown) for supplying a cooling medium (for example, cooling air) into the lead-in duct 21D may be connected to the lead-in port 21aD.

As shown in FIG. 10 and FIG. 11, the restraining member 4D includes a pair of restraining plates 8D (restraining plate 8AD on one side in the laminating direction and restraining plate 8BD on the other side in the laminating direction) disposed to sandwich the module laminate 2D from both sides in the laminating direction, and a plurality of connecting members 9D (fastening member) for connecting the pair of restraining plates 8D. The connecting member 9D applies a restraining load to the module laminate 2D in the laminating direction via the pair of restraining plates 8D. The connecting member 9D is configured by a bolt 9aD and a nut 9bD for fastening the pair of restraining plates 8D.

The restraining plate 8D is a rectangular metal plate having an area one size larger than the area of the power storage module 3D and the conductive plate 5D when viewed from the laminating direction. An insulating member FD such as a resin film is disposed between each restraining plate 8D and the conductive plate 5BD. The insulating member FD insulates between the restraining plate 8D and the conductive plate 5BD. The insulating member FD has, for example, a rectangular shape when viewed from the laminating direction. In the present embodiment, the area of the insulating member FD seen from the laminating direction is larger than the area of the power storage module 3D and the area of the conductive plate 5D, and smaller than the area of the restraining plate 8D.

The restraining plate 8D has a central portion 11D that overlaps with the module laminate 2D when viewed from the laminating direction, and an edge portion 10D extending along the second direction from the central portion 11D and not overlapping the module laminate 2D when viewed from the laminating direction. In the present embodiment, a pair of edge portions 10D are provided on both sides of the central portion 11D in the first direction. That is, the central portion 11D is sandwiched between the pair of edge portions 10D. The pair of edge portions 10D are outer edge portions extending along the longitudinal direction (here, the X direction) of the restraining plate 8D.

As an example, each edge portion 10D has a plurality of (five in the present embodiment) engaging portions 14D. The engaging portion 14D is a portion to which the connecting member 9D is engaged. At each edge portion 10D, the plurality of engaging portions 14D are disposed to be apart from each other along the longitudinal direction of the restraining plate 8D. In the present embodiment, the plurality of engaging portions 14D are disposed by equal spaces from one end to the other end of the edge portion 10D in the longitudinal direction of the restraining plate 8D. An engaging portion outer surface 14aD of the engaging portion 14D facing outward in the laminating direction is located inside a central portion outer surface 11aD in the laminating direction. In the present embodiment, the engaging portion outer surface 14aD and an outer surface 10aD of the edge portion 10D are located on the same plane. The engaging portion outer surface 14aD may be located outside the outer surface 10aD of the edge portion 10D in the laminating direction in a portion where the engaging portion 14D is not provided, or may be located inside the outer surface 10aD of the edge portion 10D in the laminating direction in a portion where the engaging portion outer surface 14aD is not provided.

A through hole 14bD extending in the laminating direction is formed in the engaging portion 14D. The through hole 14bD penetrates from the engaging portion outer surface 14aD to an engaging portion inner surface 14cD facing inward in the laminating direction in the engaging portion 14D. When viewed from the laminating direction, a plurality of (10 in this case) through holes 14bD provided in the restraining plate 8AD overlap with a plurality of through holes 14bD provided in the restraining plate 8BD.

As shown in FIG. 10 and FIG. 11, each of the plurality of connecting members 9D is inserted through the through hole 14bD. Specifically, a shaft portion of each bolt 9aD is inserted into the through hole 14bD of each restraining plate 8D. A plurality of bolts 9aD (all for fastening the restraining plates 8AD and 8BD) include a plurality of bolts 901 (first fastening member) disposed at one end portion of the restraining plates 8AD and 8BD in the first direction. The plurality of bolts 90D are arranged along the second direction on the one end portion 5bD side of the conductive plate 5AD. The plurality of bolts 90D extend along the laminating direction to pass through the inside of the lead-in duct 21D, respectively.

As an example, a head portion of the bolt 9aD is disposed on the engaging portion outer surface 14aD of the restraining plate 8AD. A distal end portion (screw tip) of the shaft portion of the bolt 9aD protrudes from the engaging portion outer surface 14aD of the restraining plate 8BD. The nut 9bD is screwed into the distal end portion of the bolt 9aD. The nut 9bD is disposed on the engaging portion outer surface 14aD of the restraining plate 8BD. As a result, the restraining plates 8AD and 8BD are fastened, and the plurality of power storage modules 3D and the plurality of conductive plates 5D are pinched by the restraining plates 8AD and 8BD to be unitized as the module laminate 2D. The plurality of bolts 9aD and the plurality of nuts 9bD restrain the plurality of power storage modules 3D and the plurality of conductive plates 5D by fastening the restraining plates 8AD and 8BD.

The end portion of the connecting member 9D in the laminating direction (hereinafter, simply referred to as "the end portion of the connecting member 9D") does not protrude outward from the central portion outer surface 11aD in the laminating direction. That is, the end portion of the connecting member 9D is located on the same plane as the central portion outer surface 11aD, or is located inside the central portion outer surface 11aD in the laminating direction. In the present embodiment, the end portion of the connecting member 9D is located inside the central portion outer surface 11aD in the laminating direction. The end portion of the connecting member 9D is a portion located most outward in the laminating direction among the portions constituting the connecting member 9D. The end portion of the connecting member 9D on the restraining plate 8AD side is the end portion of the head portion of the bolt 9aD (a surface on the side opposite to a seat surface). As shown in FIG. 11, when the distal end portion of the shaft portion of the bolt 9aD does not protrude from the end portion of the nut 9bD (end portion opposite the seating surface), the end portion of the connecting member 9D on the restraining plate 8BD side is the end portion of the nut 9bD. On the other hand, when the distal end portion of the shaft portion of the bolt 9aD protrudes from the end portion of the nut 9bD, the end portion of the connecting member 9D on the restraining plate 8BD side is the distal end portion of the shaft portion of the bolt 9aD.

In addition, as shown in FIG. 11, the engaging portion inner surface 14cD is located inside a central portion inner surface 11bD in the laminating direction. That is, a wall thickness of the engaging portion 14D is secured by extending the inner end portion of the engaging portion 14D inward in the laminating direction with respect to the central portion inner surface 11bD. Such a configuration can be realized since the engaging portion 14D does not overlap with the module laminate 2D when viewed from the laminating direction.

In addition, the engaging portion inner surface 14cD is located outside of any of the conductive plates 5AD in the laminating direction. That is, when viewed from the second direction, the engaging portion inner surface 14cD is located outside the conductive plate 5AD located in the outermost layer of the plurality of conductive plates 5AD in the laminating direction. That is, neither an inlet or an outlet of the flow path 5aD of any of the conductive plates 5AD is covered by the engaging portion 1413. As a result, the cooling medium can be easily allowed to flow through the flow path 5aD of the conductive plate 5AD. That is, the cooling medium can be smoothly led from the lead-in duct 21D into the flow path 5aD.

In addition, one edge portion 10D (edge portion 10D on the one end portion 5bD side of the conductive plate 5AD) is provided with a hole portion (not shown) through which a fixing screw 18AD for fixing the duct wall member 21cD is inserted. In the one edge portion 10D, the four hole portions are provided in the vicinity of the four engaging portions 14D other than the engaging portion 14D located at the central portion in the longitudinal direction of the restraining plate 8D. As an example, the hole portion is a through hole penetrating the edge portion 10D in the laminating direction, and is a screw hole in which a screw groove in which the fixing screw 18AD is screwed is formed on the inner surface.

As shown in FIG. 10, the duct wall member 21cD has an extending portion 21bD. The extending portion 21bD extends along a plane (XY plane) intersecting (orthogonal) in the laminating direction to face the portion provided with the hole portion on the outer surface 10aD of the edge portion 10D. The extending portion 21bD is formed in a shape and size that does not interfere with the engaging portion 14D. A through hole corresponding to the hole portion of the edge portion 10D is formed in the extending portion 21bD. The fixing screw 18AD is inserted through the through hole and screwed into the hole portion of the edge portion 10D. As a result, the duct wall member 21cD is fixed to the edge portion 10D. That is, the fixing screw 18AD inserted into the hole portion of one edge portion 10D is attached to the restraining plate 8D (one edge portion 10D) via the duct wall member 21cD. As described above, the duct wall member 21cD is fixed to the outer surface of the pair of restraining plates 8D by the fixing screw 8AD which is a member different from the bolt 9aD.

The end portion of the fixing screw 18AD in the laminating direction is located on the same plane as the central portion outer surface 11aD, or is located inside the central portion outer surface 11aD in the laminating direction. That is, as in the connecting member 9D, the fixing screw 18AD does not protrude outward from the central portion outer surface 11aD.

The operation and effect of the power storage device 1D described above will be described. Also in the power storage device 1D, as in the power storage device 10, a plurality of flow paths 5aD formed in the conductive plate 5AD serving as a flow path member are arranged along the second direction (here, the X direction), and the lead-in duct 21D is disposed to extend along the second direction with respect to one end portion 5bD of the conductive plate 5AD in the first direction (here, the Y direction). Therefore, when the inside of the lead-in duct 21D is empty, the ease of inflow of the cooling medium varies depending on the position of the flow path 5aD.

On the other hand, in the power storage device 1D according to the present embodiment, each of a plurality of bolts 90D disposed at one end portion of the restraining plates 8AD and 8BD in the first direction is extended in the lead-in duct 21D along the laminating direction to pass through the inside of the lead-in duct 21D. Therefore, since the flow of the cooling medium flowing through the inside of the lead-in duct 21D is appropriately disturbed by each bolt 9aD, variations in the ease of the inflow of the cooling medium into the each flow path 5aD according to the distance from the lead-in port are reduced. As a result, even in this configuration, the variation of the cooling performance for each position can be suppressed.

Also in the present embodiment, the above-described various modifications can be made without changing the gist of the claims.

For example, as shown by the broken lines in FIG. 10 and FIG. 11, the power storage device 1D may further include a plurality of bolt collars 91D (space holding members) mounted on the bolts 9aD inside the lead-in duct 21D. The bolt collar 91D is a rectangular tubular member for holding the space between the pair of restraining plates 8AD and 8BD. The bolt collar 91D extends in the lead-in duct 21D along the laminating direction. The length of the bolt collar 91D in the laminating direction is shorter than the length of the module laminate 2D in the laminating direction. The bolt collar 91D is formed with an insertion hole penetrating in the laminating direction (here, the Z direction). The bolt collar 91D is mounted to the bolt 9aD by inserting the bolt 9aD into the insertion hole. For example, the bolt collar 91D is mounted to all of the plurality of bolts 9aD. According to this configuration, the space between the pair of restraining plates 8AD and 8BD is held by the bolt collar 91D, and the flow aspect of the cooling medium can be controlled by adjusting the shape and size of the bolt collar 91D.

The power storage device according to the present disclosure may be any combination of the above-described embodiments and modification examples.

REFERENCE SIGNS LIST

10: power storage device
12: power storage module
14: cooling member (flow path member)
14a, 14c: one end portion
14b, 14d: the other end portion
16, 17: end plate (restraining plate)
18: restraining bolt
61: lead-in duct
61a: lead-in port
61b: lead-in side bolt (restraining bolt)
62: lead-out duct
62a: lead-out port
62b: lead-out side bolt (restraining bolt)
64: flow path
1D: power storage device
3D: power storage module
5AD: conductive plate (flow path member)
5aD: flow path
5bD: one end portion
8D, 8AD, 8BD: restraining plate
9aD: bolt (restraining bolt)
21D: lead-in duct
21aD: lead-in port

The invention claimed is:

1. A power storage device comprising:
a plurality of laminated power storage modules;
a flow path member disposed in contact with the power storage modules and having a plurality of flow paths configured to allow a cooling medium to flow along a first direction intersecting a laminating direction of the power storage modules;
a pair of restraining plates disposed to sandwich the plurality of power storage modules and the flow path member in the laminating direction;
a plurality of fastening members configured to apply a restraining load to the plurality of power storage modules and the flow path member via the pair of restraining plates by fastening the pair of restraining plates to each other; and
a lead-in duct disposed at one end portion of the flow path member in the first direction and configured to lead the cooling medium into each of the plurality of flow paths, wherein
the plurality of fastening members include a plurality of first fastening members arranged along an extending direction of the lead-in duct at one end portion of the restraining plate in the first direction, and
each of the plurality of first fastening members extends along the laminating direction to pass through the inside of the lead-in duct.

2. The power storage device according to claim 1, further comprising:
a lead-out duct disposed at the other end portion of the flow path member in the first direction and configured to allow the cooling medium led out of each of the plurality of flow paths to flow, wherein
the plurality of fastening members include a plurality of second fastening members arranged along an extending direction of the lead-out duct at the other end portion of the restraining plate in the first direction, and
each of the plurality of second fastening members extends along the laminating direction to pass through the inside of the lead-out duct.

3. The power storage device according to claim 2, wherein
the lead-in duct is provided with a lead-in port configured to lead the cooling medium into the lead-in duct,
the lead-out duct is provided with a lead-out port configured to lead the cooling medium out of the lead-out duct,
the lead-in port and the lead-out port are located on one end portion side in an arrangement direction of the plurality of flow paths, and
the plurality of first fastening members are disposed such that a space between the first fastening members adjacent to each other increases as a distance from the lead-in port increases.

4. The power storage device according to claim 2, wherein
the lead-in duct is provided with a lead-in port configured to lead the cooling medium into the lead-in duct,
the lead-out duct is provided with a lead-out port configured to lead the cooling medium out of the lead-out duct,
the lead-in port is located on one end portion side in an arrangement direction of the plurality of flow paths,
the lead-out port is located on the other end portion side in an arrangement direction of the plurality of flow paths, and
the plurality of first fastening members are disposed such that a space between the first fastening members adjacent to each other decreases as a distance from the lead-in port increases.

5. The power storage device according to claim 1, further comprising:
a plurality of space holding members configured to hold a space between the pair of restraining plates, wherein
each of the plurality of space holding members has an insertion hole disposed inside the lead-in duct and through which the first fastening member is inserted.

6. The power storage device according to claim 2, further comprising:

a plurality of space holding members configured to hold a space between the pair of restraining plates, wherein each of the plurality of space holding members has an insertion hole disposed inside the lead-in duct and through which the first fastening member is inserted.

7. The power storage device according to claim 3, further comprising:
a plurality of space holding members configured to hold a space between the pair of restraining plates, wherein each of the plurality of space holding members has an insertion hole disposed inside the lead-in duct and through which the first fastening member is inserted.

8. The power storage device according to claim 4, further comprising:
a plurality of space holding members configured to hold a space between the pair of restraining plates, wherein each of the plurality of space holding members has an insertion hole disposed inside the lead-in duct and through which the first fastening member is inserted.

\* \* \* \* \*